US011706770B2

(12) United States Patent
Yang et al.

(10) Patent No.: US 11,706,770 B2
(45) Date of Patent: Jul. 18, 2023

(54) PHYSICAL (PHY) LAYER AND MEDIA ACCESS CONTROL (MAC) LAYER OPERATIONS FOLLOWING UPLINK CANCELLATION INDICATION (ULCI)

(71) Applicant: QUALCOMM Incorporated, San Diego, CA (US)

(72) Inventors: Wei Yang, San Diego, CA (US); Peter Gaal, San Diego, CA (US); Seyedkianoush Hosseini, San Diego, CA (US); Yi Huang, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/188,973

(22) Filed: Mar. 1, 2021

(65) Prior Publication Data

US 2021/0274544 A1 Sep. 2, 2021

Related U.S. Application Data

(60) Provisional application No. 62/992,031, filed on Mar. 19, 2020, provisional application No. 62/984,206, filed on Mar. 2, 2020.

(51) Int. Cl.
*H04W 72/14* (2009.01)
*H04W 72/04* (2009.01)
(Continued)

(52) U.S. Cl.
CPC ....... *H04W 72/14* (2013.01); *H04W 28/0278* (2013.01); *H04W 52/365* (2013.01);
(Continued)

(58) Field of Classification Search
None
See application file for complete search history.

(56) References Cited

U.S. PATENT DOCUMENTS 9,955,387 B1* 4/2018 Shah ................. H04W 36/0058
2018/0332608 A1 11/2018 Guo et al.
(Continued)

FOREIGN PATENT DOCUMENTS

KR 20190114871 A 10/2019

OTHER PUBLICATIONS

International Search Report and Written Opinion—PCT/US2021/020388—ISA/EPO—dated Jun. 10, 2021 (202800WO).
(Continued)

*Primary Examiner* — Jutai Kao

(57) ABSTRACT

Methods, systems, and devices for wireless communications are described. The method, system, or devices for wireless communications may implement receiving a grant for a first transmission scheduled for a first set of resources, the first transmission associated with a first transmission parameter; receiving an indication to cancel the first transmission; dropping the first transmission based on receiving the indication; determining a second transmission parameter for a second transmission based on the first transmission parameter and irrespective of dropping the first transmission; and performing or receiving the second transmission according to the second transmission parameter. Alternatively, a device may receive an indication to cancel the second transmission; drop the second transmission based on receiving the indication; and refraining from rescheduling the first transmission on the first set of resources based on receiving the indication and irrespective of dropping the second transmission.

30 Claims, 20 Drawing Sheets

(51) Int. Cl.
  *H04W 52/36*  (2009.01)
  *H04W 28/02*  (2009.01)
  *H04W 72/12*  (2009.01)
  *H04W 72/044*  (2023.01)
  *H04W 72/1268*  (2023.01)

(52) U.S. Cl.
  CPC ....... *H04W 72/042* (2013.01); *H04W 72/048* (2013.01); *H04W 72/0473* (2013.01); *H04W 72/1268* (2013.01); *H04W 72/1289* (2013.01)

(56) References Cited

U.S. PATENT DOCUMENTS

| | | | | |
|---|---|---|---|---|
| 2019/0104477 | A1* | 4/2019 | MolavianJazi | H04W 52/242 |
| 2019/0254067 | A1* | 8/2019 | Al-Imari | H04L 1/1822 |
| 2019/0254081 | A1 | 8/2019 | Li et al. | |
| 2020/0146045 | A1* | 5/2020 | Loehr | H04W 72/1289 |
| 2020/0205173 | A1* | 6/2020 | Frederiksen | H04L 1/1887 |
| 2020/0236582 | A1* | 7/2020 | Chin | H04W 72/1242 |
| 2020/0260391 | A1* | 8/2020 | Zhou | H04W 52/146 |
| 2021/0029646 | A1* | 1/2021 | Park | H04W 52/367 |
| 2021/0136565 | A1* | 5/2021 | Saber | H04W 8/24 |
| 2021/0376985 | A1* | 12/2021 | Zhou | H04L 5/0053 |
| 2022/0022224 | A1* | 1/2022 | Lou | H04W 72/1268 |
| 2022/0159683 | A1* | 5/2022 | Islam | H04W 72/042 |
| 2022/0417982 | A1 | 12/2022 | Yang | |

OTHER PUBLICATIONS

Qualcomm: "Remaining Issues on UCI Enhancements for URLLC", 3GPP Draft, 3GPP TSG RAN WG1 #100b eMeeting, R1-2002545, 3rd Generation Partnership Project (3GPP), Mobile Competence Centre, 650, Route Des Lucioles, F-06921 Sophia-Antipolis Cedex, France, vol. RAN WG1, No. eMeeting, Apr. 20, 2020-Apr. 30, 2020, Apr. 11, 2020 (Apr. 11, 2020), XP051875659, 13 Pages, Retrieved from the Internet: URL: https://ftp.3gpp.org/tsg_ran/WG1_RL1/TSGR1_100b_e/Docs/R1-2002545.zip. R1-2002545 Remaining-Issues on UCI Enhancements for URLLC.docx [retrieved on Apr. 11, 2020] paragraph [0011] figure 3.

* cited by examiner

PHYSICAL (PHY) LAYER AND MEDIA ACCESS CONTROL (MAC) LAYER OPERATIONS FOLLOWING UPLINK CANCELLATION INDICATION (ULCI)

CROSS REFERENCE

The present Application for Patent claims the benefit of U.S. Provisional Patent Application No. 62/984,206 by YANG et al., entitled "PHYSICAL (PHY) LAYER AND MEDIA ACCESS CONTROL (MAC) LAYER OPERATIONS FOLLOWING UPLINK CANCELLATION INDICATION (ULCI)," filed Mar. 2, 2020, and the benefit of U.S. Provisional Patent Application No. 62/992,031 by YANG et al., entitled "PHYSICAL (PHY) LAYER AND MEDIA ACCESS CONTROL (MAC) LAYER OPERATIONS FOLLOWING UPLINK CANCELLATION INDICATION (ULCI)," filed Mar. 19, 2020, each of which is assigned to the assignee hereof, and each of which is expressly incorporated by reference herein.

FIELD OF TECHNOLOGY

The following relates generally to wireless communications and more specifically to physical (PHY) layer and media access control (MAC) layer operations following uplink cancellation indication (ULCI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support physical (PHY) layer and media access control (MAC) layer operations following uplink cancellation indication (ULCI). Generally, the described techniques provide for handling transmission cancellations at the PHY and MAC layers. For example, a user equipment (UE) may receive an indication from a base station cancelling at least a portion of an uplink or downlink transmission to use the resources previously allocated to the uplink or downlink transmission instead for a higher priority uplink or downlink transmission (e.g., an ultra-reliable low latency (URLLC) transmission from another UE). The UE may cancel at least a portion of the specified transmission based on receiving the indication, which may be an uplink cancellation indication (ULCI), a slot format indicator (SFI), downlink control information (DCI), or a downlink or uplink grant. In some cases, the UE may be scheduled for full duplexed communications, but may be (e.g., only be) configured for half duplex communications.

As described herein, the UE may determine a response to the cancellation indication, in particular at the PHY or MAC layers. For instance, the UE may determine how to perform power control calculations, intra-UE multiplexing, and new data indicator counting based on the cancellation indication. For example, a UE may receive a grant, from the base station, for a first transmission associated with a first transmission parameter scheduled on a first set of resources. The base station may determine that a different transmission from the first transmission may be scheduled on a set of resources at least partially overlapping the first set of resources. For example, a higher priority transmission than the first transmission may be scheduled. The base station may generate a cancellation indication based on the high priority transmission being scheduled. The UE may receive the cancellation indication, from the base station, indicating to at least partially cancel the first transmission. As a result, the UE may drop at least a portion of the first transmission based on receiving the indication. The UE may determine a second transmission parameter for a second transmission based at least in part on the first transmission parameter and irrespective of dropping the first transmission, and the UE may transmit or receive the second transmission according to the second transmission parameter.

Additionally, or alternatively, a UE may receive a first grant for a first transmission scheduled for a first set of resources and a second grant for a second transmission scheduled for a second set of resources that overlaps with the first set of resources. The UE may follow an intra-UE conflict resolution (e.g., multiplexing), which may result in the UE dropping at least a portion of the first transmission based on receiving the second grant. A base station may determine that a different transmission from the first or second transmission may be scheduled on a set of resources at least partially overlapping the second set of resources. For example, a higher priority transmission than the second transmission (e.g., a dynamically scheduled transmission) may be scheduled. The base station may generate a cancellation indication based on the high priority transmission being scheduled. After dropping a portion of the first transmission, the UE may receive the cancellation indication from the base station to at least partially cancel the second transmission, and the UE may drop at least a portion of the second transmission. Although the conflict of the second transmission with the first transmission is resolved based on the cancellation indication, the UE may refrain from rescheduling the first transmission on the first set of resources. Thus, the cancellation indication will be applied after the MAC and PHY layer procedures are complete and not change previous actions taken (e.g., for conflict resolution).

A method of wireless communications at a UE is described. The method may include receiving a grant for a first transmission scheduled for a first set of resources, the first transmission associated with a first transmission parameter, receiving an indication for the UE to at least partially cancel the first transmission, dropping at least a portion of the first transmission based on receiving the indication, determining a second transmission parameter for a second transmission based on the first transmission parameter and irrespective of dropping the first transmission, and performing or receiving the second transmission according to the second transmission parameter.

An apparatus for wireless communications at a UE is described. The apparatus may include a processor, memory coupled with the processor, and instructions stored in the memory. The instructions may be executable by the processor to cause the apparatus to receive a grant for a first transmission scheduled for a first set of resources, the first transmission associated with a first transmission parameter, receive an indication for the UE to at least partially cancel the first transmission, drop at least a portion of the first transmission based on receiving the indication, determine a second transmission parameter for a second transmission based on the first transmission parameter and irrespective of dropping the first transmission, and perform or receive the second transmission according to the second transmission parameter.

Another apparatus for wireless communications at a UE is described. The apparatus may include means for receiving a grant for a first transmission scheduled for a first set of resources, the first transmission associated with a first transmission parameter, receiving an indication for the UE to at least partially cancel the first transmission, dropping at least a portion of the first transmission based on receiving the indication, determining a second transmission parameter for a second transmission based on the first transmission parameter and irrespective of dropping the first transmission, and performing or receiving the second transmission according to the second transmission parameter.

A non-transitory computer-readable medium storing code for wireless communications at a UE is described. The code may include instructions executable by a processor to receive a grant for a first transmission scheduled for a first set of resources, the first transmission associated with a first transmission parameter, receive an indication for the UE to at least partially cancel the first transmission, drop at least a portion of the first transmission based on receiving the indication, determine a second transmission parameter for a second transmission based on the first transmission parameter and irrespective of dropping the first transmission, and perform or receive the second transmission according to the second transmission parameter.

In some examples of the method, apparatuses, and non-transitory computer-readable medium described herein, determining the second transmission parameter for the second transmission further may include operations, features, means, or instructions for determining a first transmit power for the second transmission relative to a second transmit power of the first transmission indicated by the grant irrespective of dropping the first transmission, where the second transmission parameter for the second transmission may be the first transmit power.

Some examples of the method, apparatuses, and non-transitory computer-readable medium described herein may further include operations, features, means, or instructions for transmitting a power headroom report based on the determined first transmit power and the second transmit power irrespective of dropping the first transmission.

In some examples of the method, apparatuses, and non-transitory computer-readable medium described herein, determining the second transmission parameter for the second transmission further may include operations, features, means, or instructions for determining a toggle state of a new data indicator for the second transmission irrespective of dropping the first transmission, where the second transmission parameter for the second transmission includes the toggle state of the new data indicator, and where performing or receiving the second transmission may be based on the determined toggle state of the new data indicator for the second transmission.

Some examples of the method, apparatuses, and non-transitory computer-readable medium described herein may further include operations, features, means, or instructions for determining the toggle state of the new data indicator for the second transmission may be based on a difference between a first new data indicator associated with the first transmission indicated by the grant and a second new data indicator associated with the second transmission.

Some examples of the method, apparatuses, and non-transitory computer-readable medium described herein may further include operations, features, means, or instructions for generating, at a media access control layer, a protocol data unit based on receiving the grant, and determining a buffer status of a data buffer at the media access control layer based on the first set of resources and irrespective of dropping the first transmission.

In some examples of the method, apparatuses, and non-transitory computer-readable medium described herein, determining the buffer status of the data buffer further may include operations, features, means, or instructions for transferring the protocol data unit from the data buffer at the media access control layer to a hybrid automatic repeat request buffer at a physical layer based on the first set of resources and irrespective of dropping the first transmission, storing a transport block of the protocol data unit in the hybrid automatic repeat request buffer at the physical layer, and refraining from restoring the protocol data unit in the data buffer at the media access control layer based on dropping the second transmission.

Some examples of the method, apparatuses, and non-transitory computer-readable medium described herein may further include operations, features, means, or instructions for determining a capability report indicating a number of receptions the UE may be capable of receiving in a slot or indicating a number of transmissions the UE may be capable of performing in the slot, and performing or receiving the second transmission according to the second transmission parameter based on the capability report irrespective of dropping the first transmission.

In some examples of the method, apparatuses, and non-transitory computer-readable medium described herein, the UE may be configured for half duplex communications, and where the grant includes radio resource control signaling for a set of flexible symbols. In some examples of the method, apparatuses, and non-transitory computer-readable medium described herein, the indication includes a slot format indicator or downlink control information.

In some examples of the method, apparatuses, and non-transitory computer-readable medium described herein, the first transmission and the second transmission include an uplink transmission, or the first transmission and the second transmission include a downlink transmission. In some examples of the method, apparatuses, and non-transitory computer-readable medium described herein, the first transmission includes a physical uplink shared channel, physical uplink control channel, physical random access channel, a sounding reference signal, a physical downlink shared channel, or a channel state information reference signal. In some examples of the method, apparatuses, and non-transitory computer-readable medium described herein, the indication includes an uplink cancellation indication.

A method of wireless communications at a base station is described. The method may include transmitting, to a UE, a grant for a first transmission scheduled for a first set of resources, the first transmission associated with a first transmission parameter, transmitting an indication for the UE to at least partially cancel the first transmission based on a second transmission scheduled for a second set of resource that overlaps with the first set of resources, determining a second transmission parameter for a third transmission based on the first transmission parameter, and performing or receiving the third transmission according to the second transmission parameter.

An apparatus for wireless communications at a base station is described. The apparatus may include a processor, memory coupled with the processor, and instructions stored in the memory. The instructions may be executable by the processor to cause the apparatus to transmit, to a UE, a grant for a first transmission scheduled for a first set of resources, the first transmission associated with a first transmission parameter, transmit an indication for the UE to at least partially cancel the first transmission based on a second transmission scheduled for a second set of resource that overlaps with the first set of resources, determine a second transmission parameter for a third transmission based on the first transmission parameter, and perform or receive the third transmission according to the second transmission parameter.

Another apparatus for wireless communications at a base station is described. The apparatus may include means for transmitting, to a UE, a grant for a first transmission scheduled for a first set of resources, the first transmission associated with a first transmission parameter, transmitting an indication for the UE to at least partially cancel the first transmission based on a second transmission scheduled for a second set of resource that overlaps with the first set of resources, determining a second transmission parameter for a third transmission based on the first transmission parameter, and performing or receiving the third transmission according to the second transmission parameter.

A non-transitory computer-readable medium storing code for wireless communications at a base station is described. The code may include instructions executable by a processor to transmit, to a UE, a grant for a first transmission scheduled for a first set of resources, the first transmission associated with a first transmission parameter, transmit an indication for the UE to at least partially cancel the first transmission based on a second transmission scheduled for a second set of resource that overlaps with the first set of resources, determine a second transmission parameter for a third transmission based on the first transmission parameter, and perform or receive the third transmission according to the second transmission parameter.

In some examples of the method, apparatuses, and non-transitory computer-readable medium described herein, determining the second transmission parameter for the third transmission further may include operations, features, means, or instructions for determining a first transmit power for the third transmission relative to a second transmit power of the first transmission indicated by the grant irrespective of the indication, where the second transmission parameter for the third transmission may be the first transmit power.

Some examples of the method, apparatuses, and non-transitory computer-readable medium described herein may further include operations, features, means, or instructions for receiving a power headroom report including a first transmit power of the first transmission and a second transmit power of the third transmission irrespective of the indication.

In some examples of the method, apparatuses, and non-transitory computer-readable medium described herein, determining the second transmission parameter for the third transmission further may include operations, features, means, or instructions for determining whether the third transmission includes new data with respect to the first transmission irrespective of the indication, and determining a toggle state of a new data indicator for the third transmission based on determining whether the third transmission includes the new data, where the second transmission parameter for the third transmission includes the toggle state of the new data indicator.

Some examples of the method, apparatuses, and non-transitory computer-readable medium described herein may further include operations, features, means, or instructions for receiving a capability report indicating a number of receptions that the UE may be capable of receiving in a slot or indicating a number of transmissions the UE may be capable of performing in the slot, and performing or receiving the third transmission according to the second transmission parameter based on the capability report irrespective of the indication.

In some examples of the method, apparatuses, and non-transitory computer-readable medium described herein, the UE may be configured for half duplex communications, and where the grant includes radio resource control signaling for a set of flexible symbols. In some examples of the method, apparatuses, and non-transitory computer-readable medium described herein, the indication includes a slot format indicator or downlink control information.

In some examples of the method, apparatuses, and non-transitory computer-readable medium described herein, the first transmission and the third transmission include an uplink transmission and the second transmission includes a downlink transmission, or the first transmission and the third transmission include a downlink transmission and the second transmission includes an uplink transmission.

In some examples of the method, apparatuses, and non-transitory computer-readable medium described herein, the first transmission includes a physical uplink shared channel, physical uplink control channel, physical random access channel, a sounding reference signal, a physical downlink shared channel, or a channel state information reference signal. In some examples of the method, apparatuses, and non-transitory computer-readable medium described herein, the indication includes an uplink cancellation indication.

A method of wireless communications at a UE is described. The method may include receiving a first grant for a first transmission scheduled for a first set of resources, receiving a second grant for a second transmission scheduled for a second set of resource that overlaps with the first set of resources, dropping at least a portion of the first transmission based on receiving the second grant, receiving an indication for the UE to at least partially cancel the second transmission, dropping at least a portion of the second transmission based on receiving the indication, and refraining from rescheduling the first transmission on the first set of resources based on receiving the indication and irrespective of dropping the second transmission.

An apparatus for wireless communications at a UE is described. The apparatus may include a processor, memory coupled with the processor, and instructions stored in the memory. The instructions may be executable by the processor to cause the apparatus to receive a first grant for a first transmission scheduled for a first set of resources, receive a second grant for a second transmission scheduled for a second set of resource that overlaps with the first set of resources, drop at least a portion of the first transmission based on receiving the second grant, receive an indication for the UE to at least partially cancel the second transmission, drop at least a portion of the second transmission based on receiving the indication, and refrain from rescheduling the first transmission on the first set of resources based on receiving the indication and irrespective of dropping the second transmission.

Another apparatus for wireless communications at a UE is described. The apparatus may include means for receiving a first grant for a first transmission scheduled for a first set of resources, receiving a second grant for a second transmission scheduled for a second set of resource that overlaps with the first set of resources, dropping at least a portion of the first transmission based on receiving the second grant, receiving an indication for the UE to at least partially cancel the second transmission, dropping at least a portion of the second transmission based on receiving the indication, and refraining from rescheduling the first transmission on the first set of resources based on receiving the indication and irrespective of dropping the second transmission.

A non-transitory computer-readable medium storing code for wireless communications at a UE is described. The code may include instructions executable by a processor to receive a first grant for a first transmission scheduled for a first set of resources, receive a second grant for a second transmission scheduled for a second set of resource that overlaps with the first set of resources, drop at least a portion of the first transmission based on receiving the second grant, receive an indication for the UE to at least partially cancel the second transmission, drop at least a portion of the second transmission based on receiving the indication, and refrain from rescheduling the first transmission on the first set of resources based on receiving the indication and irrespective of dropping the second transmission.

In some examples of the method, apparatuses, and non-transitory computer-readable medium described herein, refraining from rescheduling the first transmission further may include operations, features, means, or instructions for cancelling reception of the first transmission irrespective of dropping the second transmission.

In some examples of the method, apparatuses, and non-transitory computer-readable medium described herein, the first transmission includes a semi-statically configured downlink transmission and the second transmission includes a dynamically scheduled uplink transmission. In some examples of the method, apparatuses, and non-transitory computer-readable medium described herein, refraining from rescheduling the first transmission further may include operations, features, means, or instructions for cancelling transmission of the first transmission irrespective of dropping the second transmission.

In some examples of the method, apparatuses, and non-transitory computer-readable medium described herein, the first transmission includes a first uplink transmission and the second transmission includes a second uplink transmission, and where the first grant includes a configured grant and the second grant includes a dynamic grant. In some examples of the method, apparatuses, and non-transitory computer-readable medium described herein, the indication includes an uplink cancellation indication.

A method of wireless communications at a base station is described. The method may include transmitting a first grant for a first transmission scheduled for a first set of resources, transmitting a second grant for a second transmission scheduled for a second set of resource that overlaps with the first set of resources, transmitting an indication for the UE to at least partially cancel the second transmission based on a third transmission scheduled for a third set of resource that overlaps with the second set of resources, and refraining from rescheduling the first transmission on the first set of resources based on transmitting the indication.

An apparatus for wireless communications at a base station is described. The apparatus may include a processor, memory coupled with the processor, and instructions stored in the memory. The instructions may be executable by the processor to cause the apparatus to transmit a first grant for a first transmission scheduled for a first set of resources, transmit a second grant for a second transmission scheduled for a second set of resource that overlaps with the first set of resources, transmit an indication for the UE to at least partially cancel the second transmission based on a third transmission scheduled for a third set of resource that overlaps with the second set of resources, and refrain from rescheduling the first transmission on the first set of resources based on transmitting the indication.

Another apparatus for wireless communications at a base station is described. The apparatus may include means for transmitting a first grant for a first transmission scheduled for a first set of resources, transmitting a second grant for a second transmission scheduled for a second set of resource that overlaps with the first set of resources, transmitting an indication for the UE to at least partially cancel the second transmission based on a third transmission scheduled for a third set of resource that overlaps with the second set of resources, and refraining from rescheduling the first transmission on the first set of resources based on transmitting the indication.

A non-transitory computer-readable medium storing code for wireless communications at a base station is described. The code may include instructions executable by a processor to transmit a first grant for a first transmission scheduled for a first set of resources, transmit a second grant for a second transmission scheduled for a second set of resource that overlaps with the first set of resources, transmit an indication for the UE to at least partially cancel the second transmission based on a third transmission scheduled for a third set of resource that overlaps with the second set of resources, and refrain from rescheduling the first transmission on the first set of resources based on transmitting the indication.

In some examples of the method, apparatuses, and non-transitory computer-readable medium described herein, refraining from rescheduling the first transmission further may include operations, features, means, or instructions for cancelling transmission of the first transmission irrespective of the indication.

In some examples of the method, apparatuses, and non-transitory computer-readable medium described herein, the first transmission includes a semi-statically configured downlink transmission and the second transmission includes a dynamically scheduled uplink transmission. In some examples of the method, apparatuses, and non-transitory computer-readable medium described herein, refraining from rescheduling the first transmission further may include operations, features, means, or instructions for cancelling reception of the first transmission irrespective of the indication.

In some examples of the method, apparatuses, and non-transitory computer-readable medium described herein, the first transmission includes a first uplink transmission and the second transmission includes a second uplink transmission, and where the first grant includes a configured grant and the second grant includes a dynamic grant. In some examples of the method, apparatuses, and non-transitory computer-readable medium described herein, the indication includes an uplink cancellation indication.

DETAILED DESCRIPTION

Figure 1:
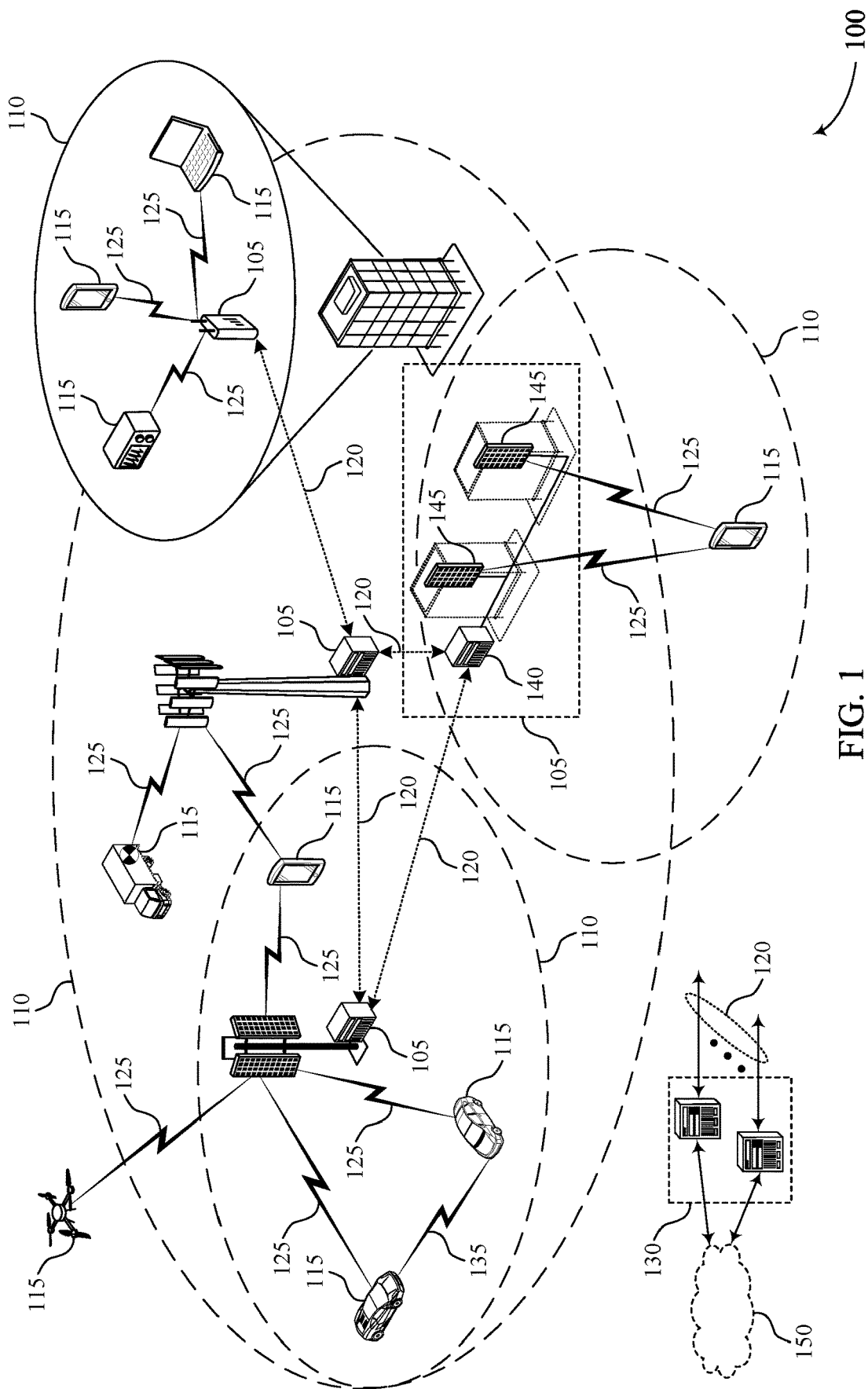
FIG. 1 illustrates an example of a wireless communications system that supports physical (PHY) layer and media access control (MAC) layer operations following uplink cancellation indication (ULCI) in accordance with aspects of the present disclosure.

In some wireless communications systems, a user equipment (UE) may support the use of a cancellation indication, also known as a preemption indication, to configure overlapping transmissions based on priority. A base station may transmit a cancellation indication to a UE requesting at least a portion of a transmission. As a result, the UE may cancel reception or transmission of at least part of the indicated transmission. The UE also may perform physical (PHY) layer and media access control (MAC) layer procedures following reception of a cancellation indication. In some cases, a UE may be configured with a specific order of procedures when a cancellation indication is supported, and the configured order of operations may allow a UE to efficiently perform layer procedures, transmission cancellation, and reception or transmission of subsequent transmissions.

For example, the order of operation may apply to all PHY and MAC layer procedures or may be specific to unique PHY or MAC layer procedures. The configured order may allow the UE to reduce transmission latency by reducing the number of changes to the PHY or MAC layer procedures. In some examples, there may be no updates to previously performed PHY and MAC layer procedures when a UE receives a cancellation indication. The PHY and MAC layer procedures may include power control, intra-UE multiplexing, new data indicator (NDI) counting, MAC protocol data unit (PDU) generation, buffer management, as well as other PHY and MAC operations.

The order of operation may apply to uplink and downlink operations, and in some cases, a UE may be constrained to half-duplex communications. For example, a number of uplink transmissions may be configured at a UE, and the UE may then receive a cancellation indication cancelling at least a portion of an uplink transmission. After the UE drops the uplink transmission, the UE may determine transmission parameters for the remainder of uplink transmissions as if the specified transmission was not dropped. In another example, a number of downlink transmissions may be configured to be received by a UE, and a dynamically scheduled downlink transmission may preempt one of the previously configured downlink transmissions. Thus, the base station may transmit a cancellation indication to the UE indicating another transmission will preempt at least a portion of a previously scheduled downlink transmission. After the UE drops the indication portion of the indicated transmission, the UE may refrain from updating a previously determined transmission parameter for the remaining downlink transmissions. In some cases, both downlink and uplink transmissions may be considered in the configured order of operations.

Aspects of the disclosure are initially described in the context of wireless communications systems. Aspects of the disclosure are further illustrated by and described with reference to apparatus diagrams, system diagrams, and flowcharts that relate to PHY layer and MAC layer operations following uplink cancellation indication (ULCI).

FIG. 1 illustrates an example of a wireless communications system 100 that supports PHY layer and MAC layer operations following ULCI in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, which may include the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may determine a reaction to a cancellation indication received from a base station 105, in particular a reaction at the PHY or MAC layers. For instance, the UE 115 may determine how to perform power control calculations, intra-UE multiplexing, and new data indicator counting based on the cancellation indication. For example, a UE 115 may receive a grant, from the base station 105, for a first transmission associated with a first transmission parameter scheduled on a first set of resources. The base station 105 may later determine that a different transmission from the first transmission may be scheduled on a set of resources at least partially overlapping the first set of resources. For example, a higher priority transmission than the first transmission may be scheduled. The base station 105 may generate and transmit a cancellation indication for the UE 115 based on the high priority transmission being scheduled. The UE 115 may receive the cancellation indication, and the UE 115 may drop at least a portion of the first transmission based on receiving the indication. The UE 115 may also determine a second transmission parameter for a second transmission scheduled subsequent to the first transmission based at least in part on the first transmission parameter and irrespective of dropping the first transmission, and the UE 115 may transmit or receive the second transmission according to the second transmission parameter. Thus, the cancellation indication may be applied at the UE 115 after the MAC and PHY layer procedures are complete and may not change previous procedures.

Additionally, or alternatively, a UE 115 may receive a first grant for a first transmission scheduled for a first set of resources as well as a second grant for a second transmission scheduled for a second set of resources that overlaps with the first set of resources. The UE 115 may follow an intra-UE multiplexing conflict resolution, which may result in the UE 115 dropping at least a portion of the first transmission based on receiving the second grant. A base station 105 may determine that a different transmission from the first or second transmissions may be scheduled on a set of resources at least partially overlapping the second set of resources. For example, a higher priority transmission than the second transmission (e.g., a dynamically scheduled transmission) may be scheduled. The base station 105 may generate and transmit a cancellation indication to the UE 115 based on the high priority transmission being scheduled. After dropping a portion of the first transmission due to intra-UE multiplexing conflict resolution, the UE 115 may receive the cancellation indication from the base station 105 to at least partially cancel the second transmission, and the UE 115 may drop at least a portion of the second transmission. Although the conflict of the second transmission with the first transmission is resolved based on the cancellation indication, the UE 115 may refrain from rescheduling the first transmission on the first set of resources. Thus, the cancellation indication may be applied at the UE 115 after the MAC and PHY layer procedures are complete and may not change previous actions taken (e.g., for conflict resolution).

Figure 2:
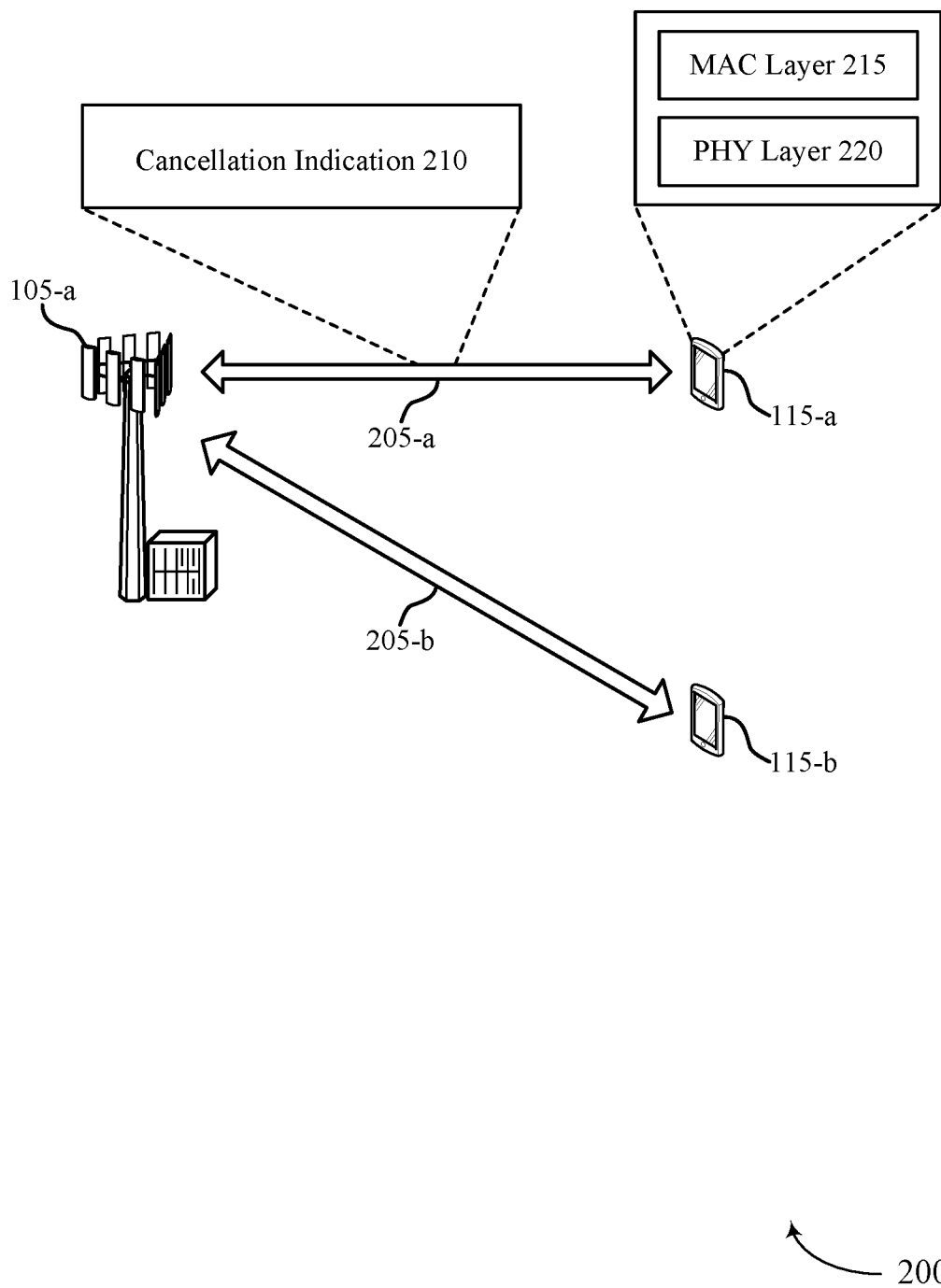
FIG. 2 illustrates an example of a wireless communications system that supports PHY layer and MAC layer operations following ULCI in accordance with aspects of the present disclosure.

FIG. 2 illustrates an example of a wireless communications system 200 that supports PHY layer and MAC layer operations following ULCI in accordance with aspects of the present disclosure. In some examples, wireless communications system 200 may implement aspects of wireless communications system 100. Wireless communications system 200 may include UEs 115-a and 115-b, which may be examples of a UE 115, as described with reference to FIG. 1. UEs 115-a and 115-b may support cancellation indication 210. Wireless communications system 200 may support new radio (NR) operation and may include base station 105-a, which may be an example of a base station 105, as described with reference to FIG. 1.

In wireless communications system 200, the UE 115-a may be in communication with base station 105-a via link 205-a. Base station 105-a may also be in communication with the UE 115-b via link 205-b. Wireless communications system 200 may support dynamic time division duplexing (TDD) such that an OFDM symbol on link 205-a may be configured (e.g., semi-statically configured via RRC) to be either uplink, downlink, or flexible. The semi-statically configured flexible symbols may be converted to be uplink or downlink via either a dynamic slot-format indicator (SFI) or a dynamic grant (e.g., DCI format 0_1,1_1,0_0,1_0,0_2, 1_2). The UE 115-a may be configured to transmit or receive signals via RRC signaling on a set of symbols that are indicated as flexible symbols. For example, UE 115-a may be configured (e.g., via RRC) to transmit a physical uplink shared channel (PUSCH) (e.g., a configured grant PUSCH), a sounding reference signal (SRS), physical uplink control channel (PUCCH), or physical random access channel (PRACH). In another example, the UE 115-a may be configured (e.g., via RRC) to receive a physical downlink shared channel (PDSCH) or CSI-RS.

Base station 105-a may transmit a cancellation indication 210 to UE 115-a via link 205-a. The cancellation indication 210 may instruct the UE 115-a to cancel at least a portion of a transmission (e.g., uplink or downlink transmission). UE 115-a may perform procedures at the MAC layer 215 or the PHY layer 220, or both, as if the transmission was performed and before the transmission was canceled by the cancellation indication 210. Thus, the cancellation indication 210 may be applied at the UE 115-a after the MAC layer 215 and PHY layer 220 procedures are complete and may not change previous actions taken.

By supporting cancellation indication 210, the UE 115-a may cancel at least a portion of a transmission based on receiving the cancellation indication 210. In some examples, the cancellation indication 210 may allow the base station 105-a to schedule one or more preemptive transmissions (e.g., URLLC transmissions for UE 115-b) on resources that were previously allocated to lower priority transmission (e.g., eMBB transmissions for UE 115-a). In the uplink, the base station 105-a may use the cancellation indication 210 (e.g., an uplink cancellation indication (ULCI) or an uplink preemption indication (ULPI)) to indicate to UE 115-a to cancel a part of its transmission (e.g., eMBB transmissions for UE 115-a) that overlaps in time or frequency, or both, with the urgent transmission (e.g., URLLC transmissions for UE 115-b) from other users.

In some cases, the UE 115-a may be scheduled for full-duplex communication (i.e., scheduled to concurrently transmit and receive), but the UE 115-a may be constrained to half-duplex communications (i.e., transmit and receive during different time periods). Thus, the cancellation indication 210 may be an indication for full-duplex communications at UE 115-a that the UE 115-a may drop a communication to remain in half-duplex operation. For example, the UE 115-a may drop a PUSCH, SRS, PRACH, or PUCCH transmission on semi-statically configured flexible symbols, if the UE 115-a receives a dynamic SFI that indicates these symbols to be downlink or flexible. In another example, the UE 115-a may drop a PUSCH or SRS transmission on semi-statically configured flexible symbols, if the UE 115-a receives a DCI format (e.g., DCI format 0_1,1_1,0_0,1_0,0_2,1_2) indicating that the UE 115-a may receive CSI-RS or PDSCH on these symbols. In yet another example, the UE 115-a may drop a PDSCH or CSI-RS reception on as set of semi-statically configured flexible symbols, if the UE 115-a receives a dynamic SFI that indicates these symbols to be uplink or flexible. In another example, the UE 115-a may drop a PDSCH or CSI-RS reception on a set of semi-statically configured flexible symbols, if the UE 115-a receives a DCI format (e.g., DCI format 0_1,1_1,0_0,1_0,0_2,1_2) indicating the UE 115-a to transmit a PUSCH, PUCCH, SRS, or PRACH on at least one symbol in the set of symbols.

The cancellation indication 210 may be transmitted by base station 105-a before the affected transmission is performed (e.g., eMBB PUSCH transmission). UE 115-a may cancel the overlapping part of its transmission after receiving the cancellation indication 210, hence the previously scheduled transmission may not interfere with the preemptive transmission. With the original transmission canceled, UE 115-a may determine how the cancellation will impact the MAC layer 215 and PHY layer 220 procedures for other transmissions at the UE 115-a. If the UE 115-a cancels a PUSCH, an SRS, a PUCCH, or a PRACH transmission or if the UE 115-a cancels a PDSCH or a CSI-RS reception due to a half-duplex constraint, then the UE 115-a behavior to transmit other uplink transmissions or to receive other downlink transmissions or performing other MAC layer 215 or PHY layer 220 procedures may (e.g., shall) not be changed due to these dropping events resulting from the cancellation indication 210. Thus, from the perspective of these MAC layer 215 or PHY layer 220 procedures, the canceled transmission or reception is considered to have occurred.

As described herein, each transmission at the UE 115-a may be associated with transmission parameters. In some examples, the transmission parameter of a transmission may be relative to a transmission parameter of a previous transmission. The transmission parameter may include power control, intra-UE multiplexing, NDI counting, MAC PDU generation, and the like. The cancellation indication 210 may cancel a previously scheduled transmission, however, the cancellation indication 210 may not impact any other MAC layer 215 or PHY layer 220 behavior from the UE 115-a. Therefore, if UE 115-a cancels a transmission (e.g., a PUSCH or an SRS) due to detection of the cancellation indication 210 (e.g., a DCI format 2_4), then the UE 115-a may transmit or receive other transmissions as if the cancellation indication 210 is not present. For example, the UE 115-a may perform other MAC layer 215 or PHY layer 220 procedures that may not be affected by the cancellation indication 210.

Figure 3:
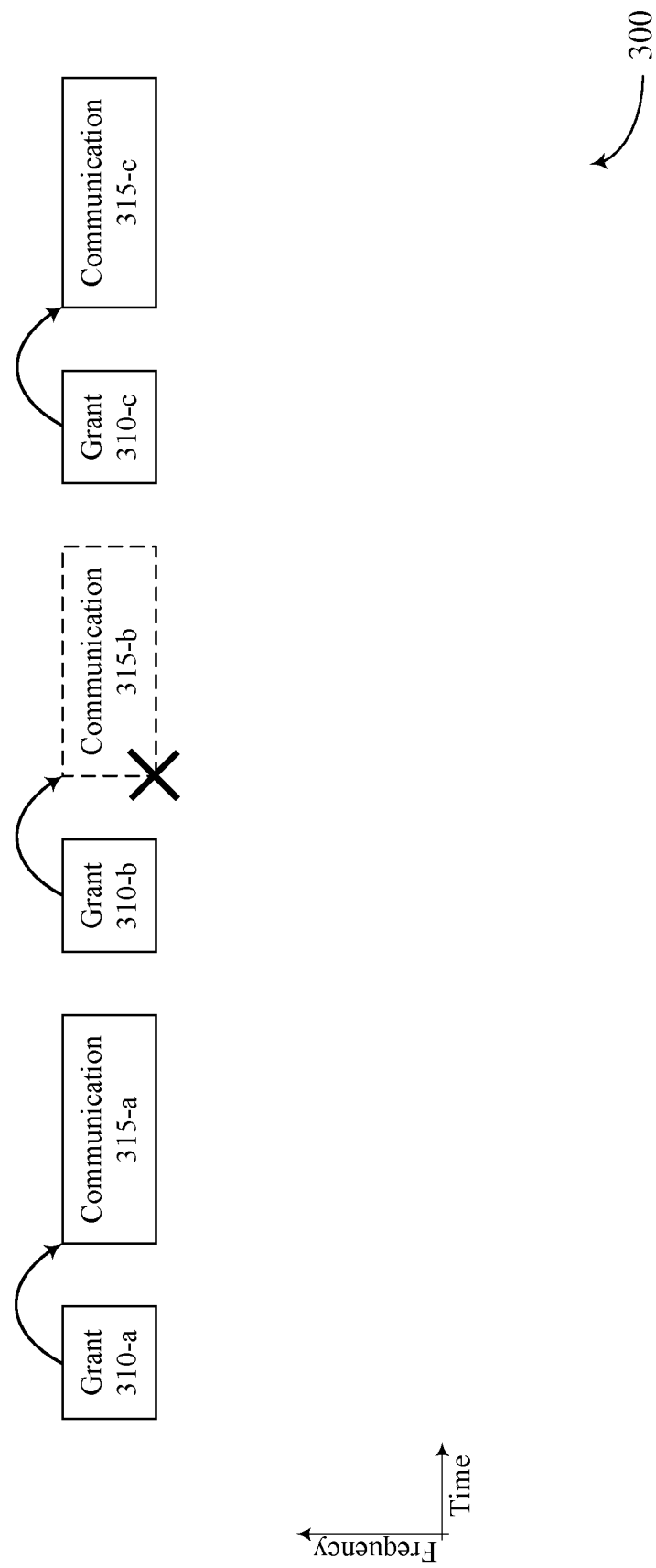
FIG. 3 illustrates an example of a timeline that supports PHY layer and MAC layer operations following ULCI in accordance with aspects of the present disclosure.

FIG. 3 illustrates an example of a timeline 300 that supports PHY layer and MAC layer operations following ULCI in accordance with aspects of the present disclosure. In some examples, timeline 300 may implement aspects of wireless communications system 100 or 200, or both. Timeline 300 may take place at a UE 115 and may include a number of grants 310 (e.g., uplink or downlink grants) from a base station 105, where each grant 310 is associated with a communication 315.

The UE 115 may receive a cancellation indication for at least a portion of communication 315-b. The UE 115 may cancel at least a portion of communication 315-b as shown by the "X" in FIG. 3. The UE 115 dropping of communication 315-b may not impact other MAC layer or PHY layer procedures for communications 315-a or 315-c.

In some cases, the UE 115 PHY layer procedures may include power control and PHR calculation. The cancellation indication may not impact UE 115 behavior to calculate transmit power of uplink transmissions. For example, communication 315-a may be associated with a transmit power as a transmission parameter. Grant 310-b may include a transmit power control parameter, delta 1, for communication 315-b, which may be relative to the transmit power of communication 315-a. Additionally, or alternatively, grant 310-c may include a transmit power control parameter, delta 2, for communication 315-c, which may be relative to the transmit power of communication 315-a and 315-b. For example, the transmit power for communication 315-c may be calculated as the accumulation of the transmit power of communication 315-a, delta 1, and delta 2. If the communication 315-b is dropped due to a cancellation indication, then the cancellation indication may not impact the transmit power control accumulation for communication 315-c, subsequent to the canceled communication 315-b. Thus, the UE 115 may accumulate the power control command indicated in the uplink or downlink grant 310-b, delta 1, associated with the canceled communication 315-b (e.g., a canceled PUSCH or canceled SRS, or both). In some examples, the UE 115 may calculate a power headroom report (PHR) to include on the transmit power of a canceled communication (e.g., communication 315-b).

In another example, the UE 115 PHY layer procedures may include NDI counting. The cancellation indication may not impact UE 115 behavior to determine when an NDI indicator is toggled. For example, communication 315-a may be associated with an NDI value (e.g., 0) as a transmission parameter. Grant 310-b may include an NDI value (e.g., 1) for communication 315-b that indicates new data is present, which may be determined relative to the NDI value of communication 315-a. Also, grant 310-c may include an NDI value (e.g., 1) for communication 315-c that indicates no new data is present, which may be determined relative to the NDI value of communication 315-b. If a UE 115 detects a cancellation indication to cancel communication 315-b (e.g., a PUSCH), where the communication 315-b is scheduled by grant 310-b (e.g., an uplink grant with a HARQ process ID and a first NDI value), and the UE 115 detects grant 310-c (e.g., a second uplink grant) scheduling communication 315-c (e.g., a second PUSCH with the HARQ process ID and with a second NDI value), and no other uplink grant with the HARQ process ID is received between grant 310-b and 310-c, then the UE 115 may determine whether the NDI of grant 310-c is toggled or not based on the NDI value of grant 310-b. For instance, if the NDI value of grant 310-c (e.g., 1) is equal to the NDI value of grant 310-b (e.g., 1), then the NDI of grant 310-c is not toggled. Otherwise, the NDI of grant 310-c is not equal to the NDI value of grant 310-b, and the NDI of grant 310-c is toggled. Thus, even though the communication 315-b is canceled, the NDI of grant 310-b may still used to determine the NDI status of future communications with the same HARQ process ID.

In another example, the UE 115 MAC layer procedures may include MAC PDU generation and HARQ buffer management. A MAC layer may processes grant 310-b by generating a PDU and TB if a new TB is scheduled by the grant 310-b, empty the HARQ buffer and fill-in the new TB, and determine a buffer status report (BSR) for a data buffer. A cancellation indication received by the UE 115 may not impact the UE 115 behavior to generate a MAC PDU and manage HARQ buffer for the corresponding HARQ process. For example, if a new transport block (TB) is generated due to reception of the grant 310-b, then UE 115 may keep the new TB in a HARQ buffer. Buffer status may be determined based on the communication 315-b corresponding to grant 310-b is performed (e.g., transmitted). The MAC layer may rely on a lower layer (e.g., the PHY layer) to retransmit the TB in order to compensate for the canceled communication 315-b (e.g., PUSCH) transmission due to the cancellation indication.

In another example, the UE 115 PHY layer procedure may include determining a number of PDSCH receptions or PUSCH transmissions supported in a slot at UE 115. In case some of the PDSCH receptions or PUSCH transmissions are canceled due to a half-duplex constraint, the canceled PDSCH receptions or PUSCH transmissions may be counted as the supported PDSCH receptions or PUSCH transmissions in the slot for capability purposes. For example, if communications 315 are PUSCH transmissions and the UE 115 reported a capability of three PUSCH transmissions in a slot, then if communication 315-b is canceled by a cancellation indication, the UE 115 is not expected to transmit an additional PUSCH relative to the originally scheduled PUSCH transmissions before the cancellation indication was received.

Figure 4A:
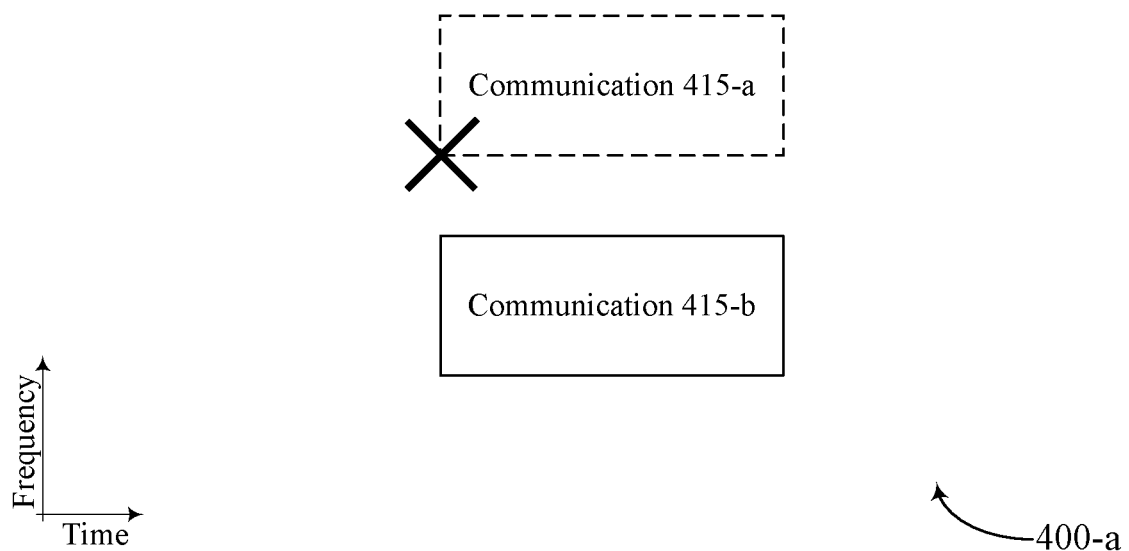
FIGS. 4A and 4B illustrate examples of a timeline that supports PHY layer and MAC layer operations following ULCI in accordance with aspects of the present disclosure.
Figure 4B:
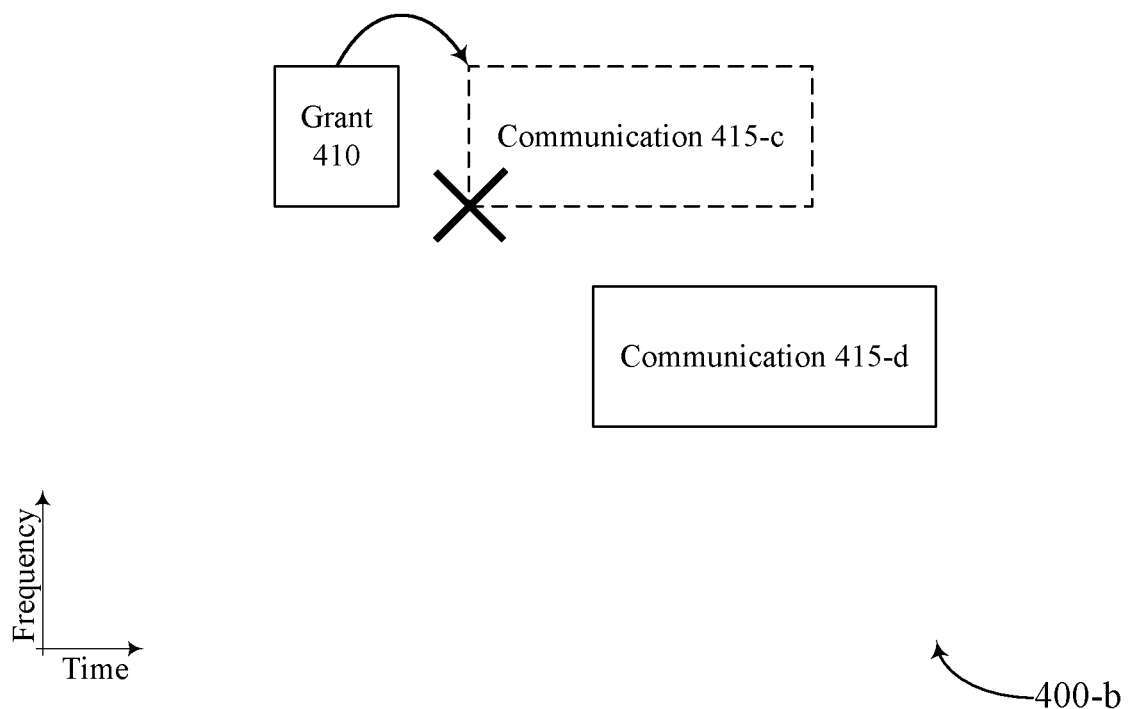

FIGS. 4A and 4B illustrate examples of a timeline 400 that supports PHY layer and MAC layer operations following ULCI in accordance with aspects of the present disclosure. In some examples, timeline 400 may implement aspects of wireless communications system 100 or 200, or both. Timeline 400 may take place at a UE 115 and may include a number of communications 415.

FIG. 4A shows a timeline 400-a that may include a number of communications 415, and in some cases, the communications 415 may be on different component carriers (CCs) that overlap at least partially in time. In this example, a cancellation indication may be received that cancels at least a portion of communication 415-a, however, the cancellation indication may not impact the UE 115 behavior to calculate PHR. For instance, if UE 115 is scheduled to transmit two communications 415-a and 415-b (e.g., two PUSCHs) on two respective CCs, and the UE 115 cancels communication 415-a due to detection of a cancellation indication, the PHR in the communications 415 is calculated by ignoring the cancellation indication and by taking into account the power of both communications 415-a and 415-b, which includes the canceled communication 415-a.

In another example, a UE 115 may have a downlink uplink scheduling conflict, for example, communication 415-a may be a dynamically scheduled uplink transmission and communication 415-b may be a semi-statically configured downlink transmission. In this examples, the UE 115 may cancel the communication 415-b (e.g., a semi-statically configured downlink transmission (e.g., semi-persistent scheduling (SPS) or CSI-RS)) by receiving another dynamically scheduled communication 415-a (e.g., a PUSCH or A-SRS). In some cases, the dynamically scheduled communication 415-a may be canceled due to a cancellation indication. In this case, the UE 115 is not expected to receive the previously semi-statically configured communication 415-*b* (e.g., a downlink transmission). For example, if the dynamically scheduled communication 415-*a* is canceled due to a cancellation indication, then the UE 115 may not change the previous cancellation of communication 415-*b* for downlink uplink scheduling conflict based on the cancellation indication resolving the downlink uplink scheduling conflict.

FIG. 4B shows a timeline 400-*b* that may include a grant 410 and a number of communications 415-*c* and 415-*d*. Grant 410 may be associated with communication 415-*c*. In some cases, UE 115 may have a configured grant (CG) and dynamic grant (DG) conflict for communications 415-*c* and 415-*d*. If a communication 415-*c* (e.g., a PUSCH) is scheduled by a DG, the UE 115 may cancel communication 415-*d* (e.g., a PUSCH) scheduled by a CG. In some examples, the UE 115 may subsequently receive a cancellation indication that cancels communication 415-*c* (e.g., the DG PUSCH). In this example, the UE 115 is not expected to transmit communication 415-*d* (e.g., in the CG occasion) either. For example, if the dynamically scheduled communication 415-*c* is canceled due to a cancellation indication, then the UE 115 may not change the previous cancellation of communication 415-*d* for CG and DG conflict based on the cancellation indication resolving the CG and DG conflict.

Figure 5:
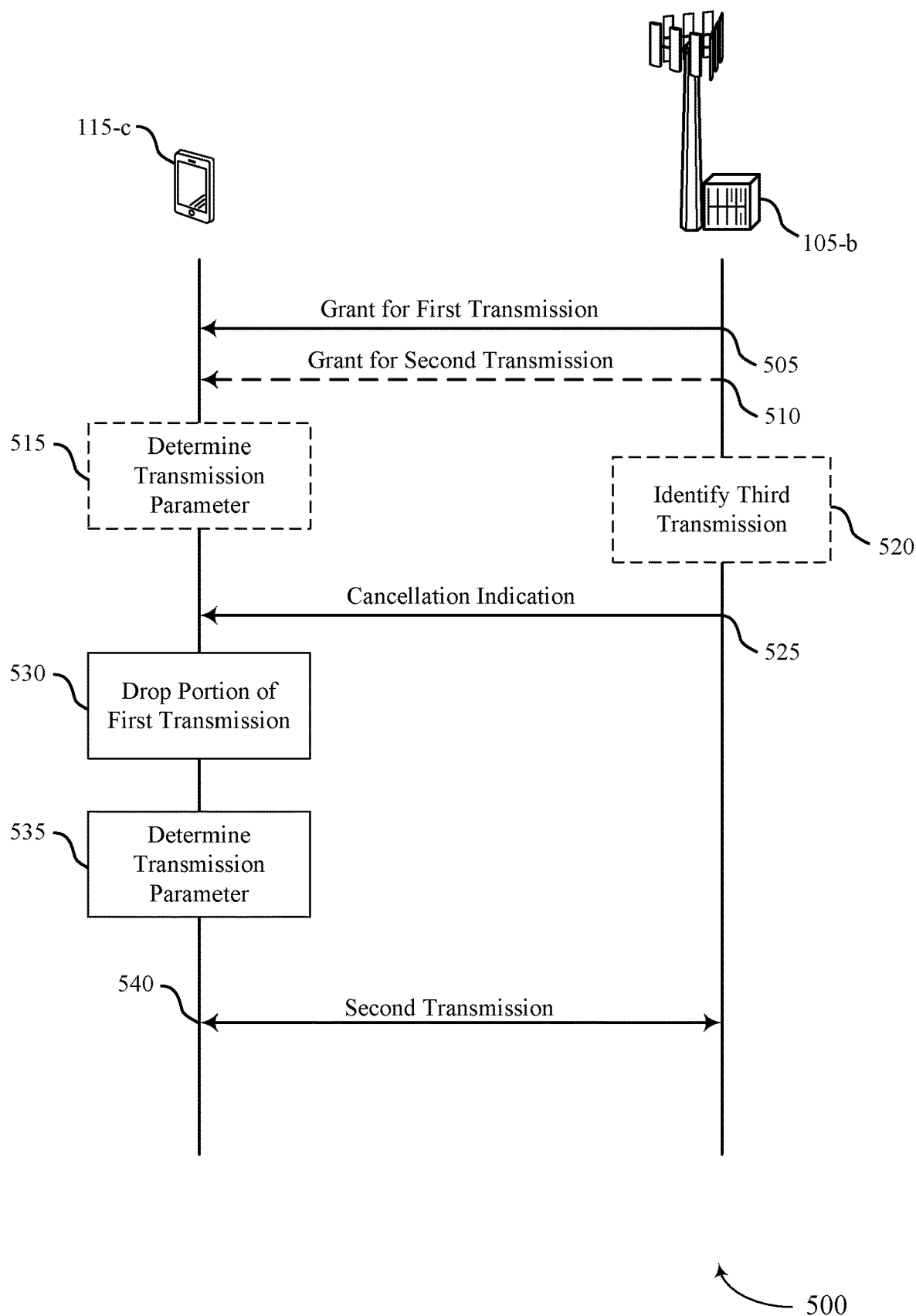
FIG. 5 illustrates an example of a process flow that supports PHY layer and MAC layer operations following ULCI in accordance with aspects of the present disclosure.

FIG. 5 illustrates an example of a process flow 500 that supports PHY layer and MAC layer operations following ULCI in accordance with aspects of the present disclosure. In some examples, process flow 500 may implement aspects of wireless communications system 100 or 200, or both. Process flow 500 is shown as being implemented by a UE 115-*c*, which may be an example of the UEs 115 as described with respect to FIGS. 1 and 2. For example, UE 115-*c* may be an example of UE 115-*a* of FIG. 2. Process flow 500 is also shown as being implemented by base station 105-*b*, which may be an example of the base station 105 as described with respect to FIGS. 1 and 2. For example, base station 105-*b* may be an example of base station 105-*a* of FIG. 2.

In the following description of the process flow 500, the operations of UE 115-*c* and base station 105-*b* may occur in a different order than the exemplary order shown. Some illustrated operations may also be left out of the process flow 500, or other operations may be added to the process flow 500. It is to be understood that while UE 115-*c* and base station 105-*b* are shown performing a number of the operations of process flow 500, any wireless device may perform the operations shown.

At 505, base station 105-*b* may transmit and UE 115-*c* may receive a grant for a first transmission scheduled for a first set of resources, the first transmission associated with a first transmission parameter.

At 510, base station 105-*b* may transmit and UE 115-*c* may receive a grant for a second transmission scheduled for a second set of resources, the second transmission associated with a second transmission parameter.

At 515, UE 115-*c* may determine a transmission parameter for at least one of the first transmission or the second transmission based at least in part on the first grant and the second grant.

At 520, base station 105-*b* may identify a third transmission (e.g., a full-duplex or URLLC transmission) that at least partially overlaps with the first transmission, and the base station 105-*b* may generate a cancellation indication based on the third transmission.

At 525, base station 105-*b* may transmit and UE 115-*c* may receive an indication for the UE 115-*c* to at least partially cancel the first transmission associated with the grant received at 505.

At 530, UE 115-*c* may drop at least a portion of the first transmission based at least in part on receiving the indication at 525.

At 535, UE 115-*c* may determine a transmission parameter for at least one of the first transmission or the second transmission based at least in part on the first transmission parameter and/or irrespective of dropping the first transmission. In some cases, this may include determining to use the parameter determined at 515 or refraining from changing the parameter determined at 515.

At 535, UE 115-*c* may perform or receive the second transmission according to the second transmission parameter determined at 510 or 530.

Figure 6:
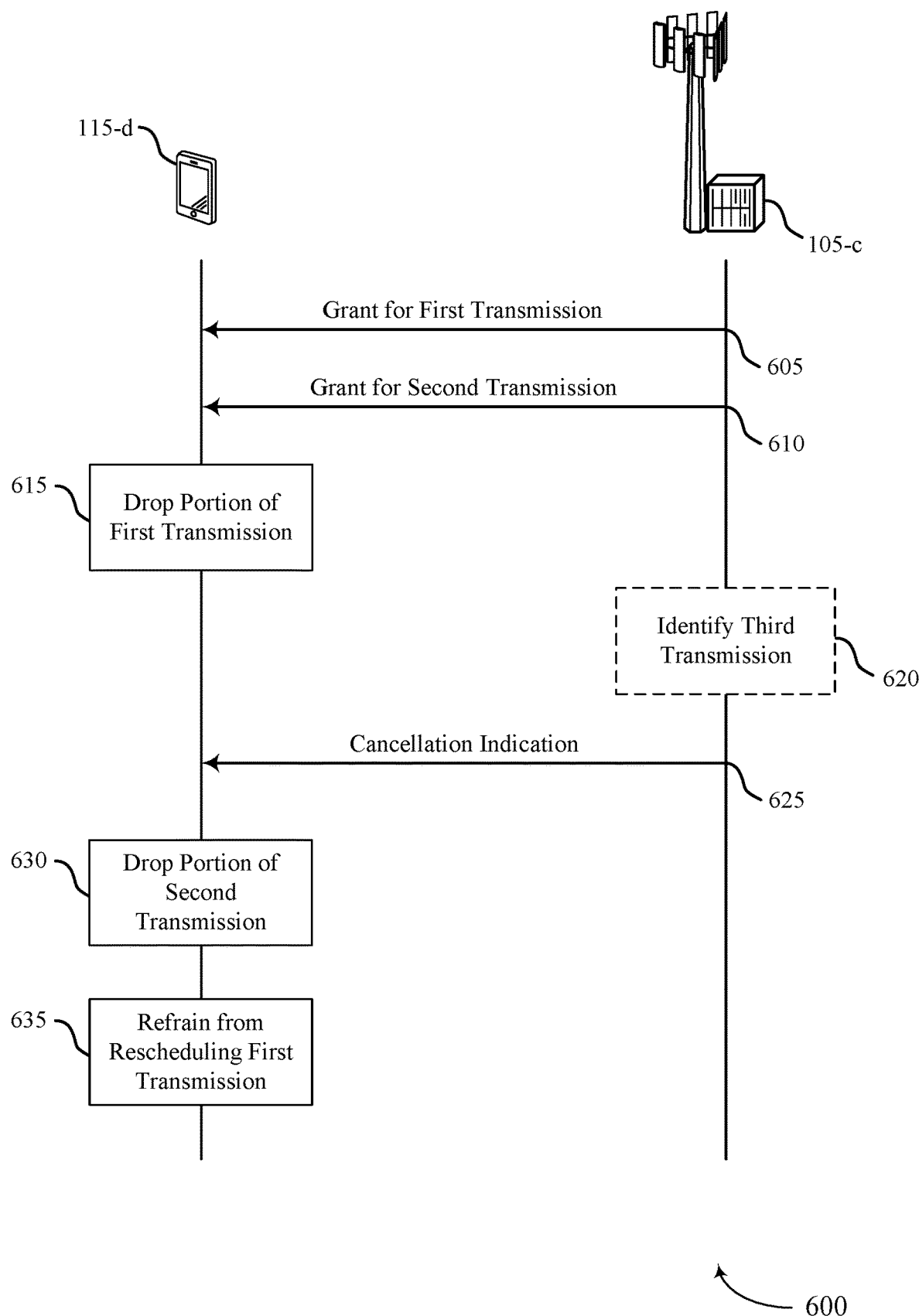
FIG. 6 illustrates an example of a process flow that supports PHY layer and MAC layer operations following ULCI in accordance with aspects of the present disclosure.

FIG. 6 illustrates an example of a process flow 600 that supports PHY layer and MAC layer operations following ULCI in accordance with aspects of the present disclosure. In some examples, process flow 600 may implement aspects of wireless communications system 100 or 200, or both. Process flow 600 is shown as being implemented by a UE 115-*d*, which may be an example of the UEs 115 as described with respect to FIGS. 1 and 2. For example, UE 115-*d* may be an example of UE 115-*a* of FIG. 2. Process flow 600 is also shown as being implemented by base station 105-*c*, which may be an example of the base station 105 as described with respect to FIGS. 1 and 2. For example, base station 105-*c* may be an example of base station 105-*a* of FIG. 2.

In the following description of the process flow 600, the operations of UE 115-*d* and base station 105-*c* may occur in a different order than the exemplary order shown. Some illustrated operations may also be left out of the process flow 600, or other operations may be added to the process flow 600. It is to be understood that while UE 115-*d* and base station 105-*c* are shown performing a number of the operations of process flow 600, any wireless device may perform the operations shown.

At 605, base station 105-*c* may transmit and UE 115-*d* may receive a grant for a first transmission scheduled for a first set of resources, the first transmission associated with a first transmission parameter.

At 610, base station 105-*c* may transmit and UE 115-*d* may receive a grant for a second transmission scheduled for a second set of resources that overlaps with the first set of resources, the first transmission associated with a first transmission parameter.

At 615, UE 115-*d* may drop at least a portion of the first transmission associated with the grant received at 605 based on receiving the second grant at 610 and the sets of resources overlapping.

At 620, base station 105-*c* may identify a third transmission (e.g., a full-duplex or URLLC transmission) that at least partially overlaps with the first transmission, and the base station 105-*c* may and generate a cancellation indication based on the third transmission.

At 625, base station 105-*b* may transmit and UE 115-*c* may receive an indication for the UE to at least partially cancel the second transmission associated with the grant received at 610.

At 630, UE 115-*d* may drop at least a portion of the second transmission based at on receiving the indication at 625.

At 635, UE 115-*d* may refrain from rescheduling the first transmission dropped at 615 based on receiving the indication at 625 and irrespective of dropping the second transmission at 630.

Figure 7:
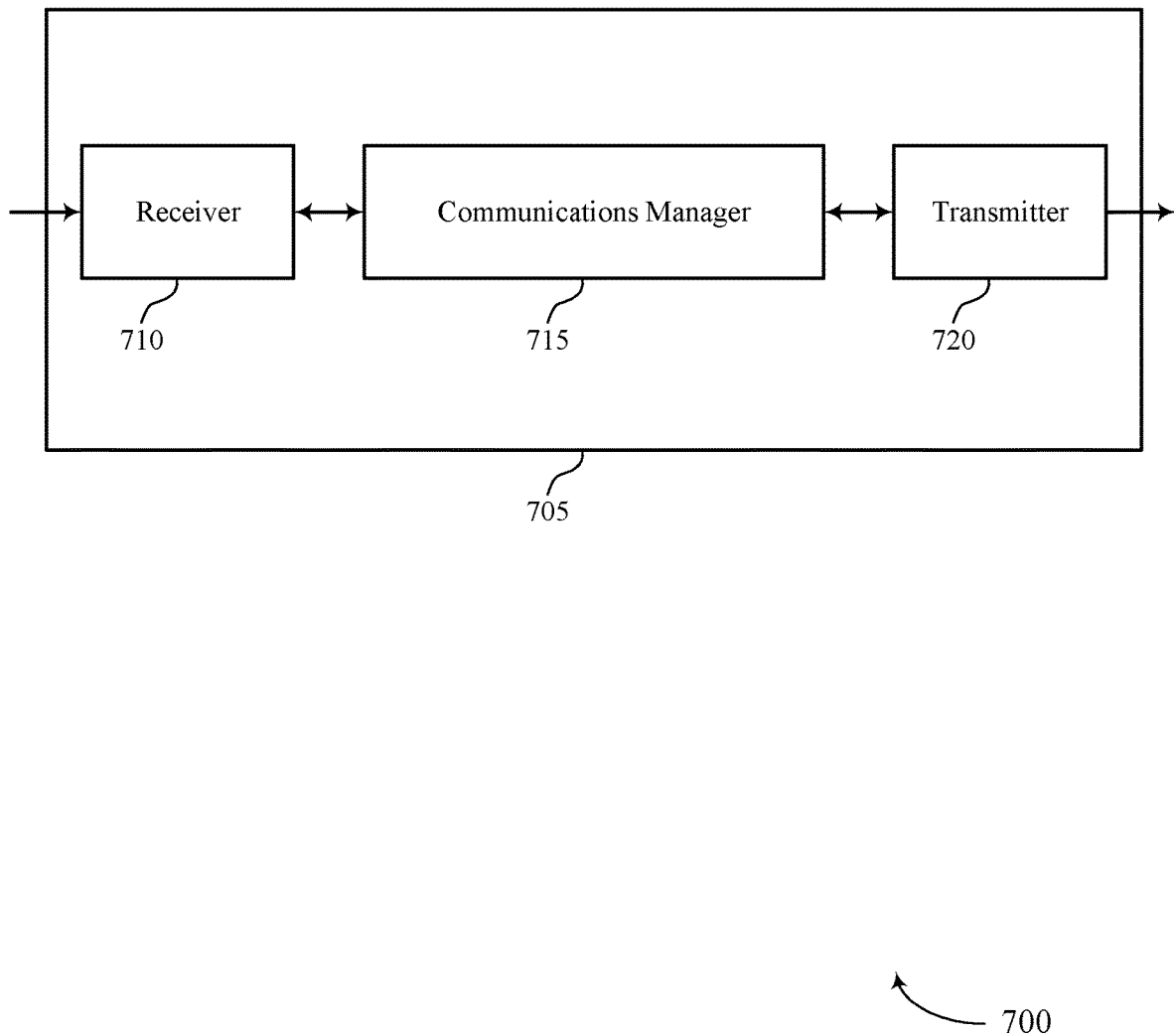
FIGS. 7 and 8 show block diagrams of devices that support PHY layer and MAC layer operations following ULCI in accordance with aspects of the present disclosure.

FIG. 7 shows a block diagram 700 of a device 705 that supports PHY layer and MAC layer operations following ULCI in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to PHY layer and MAC layer operations following ULCI, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a grant for a first transmission scheduled for a first set of resources, the first transmission associated with a first transmission parameter, receive an indication for the UE to at least partially cancel the first transmission, drop at least a portion of the first transmission based on receiving the indication, determine a second transmission parameter for a second transmission based on the first transmission parameter and irrespective of dropping the first transmission, and perform or receive the second transmission according to the second transmission parameter. The communications manager 715 may also receive a first grant for a first transmission scheduled for a first set of resources, receive a second grant for a second transmission scheduled for a second set of resources that overlaps with the first set of resources, drop at least a portion of the first transmission based on receiving the second grant, receive an indication for the UE to at least partially cancel the second transmission, drop at least a portion of the second transmission based on receiving the indication, and refrain from rescheduling the first transmission on the first set of resources based on receiving the indication and irrespective of dropping the second transmission. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including, but not limited to, an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
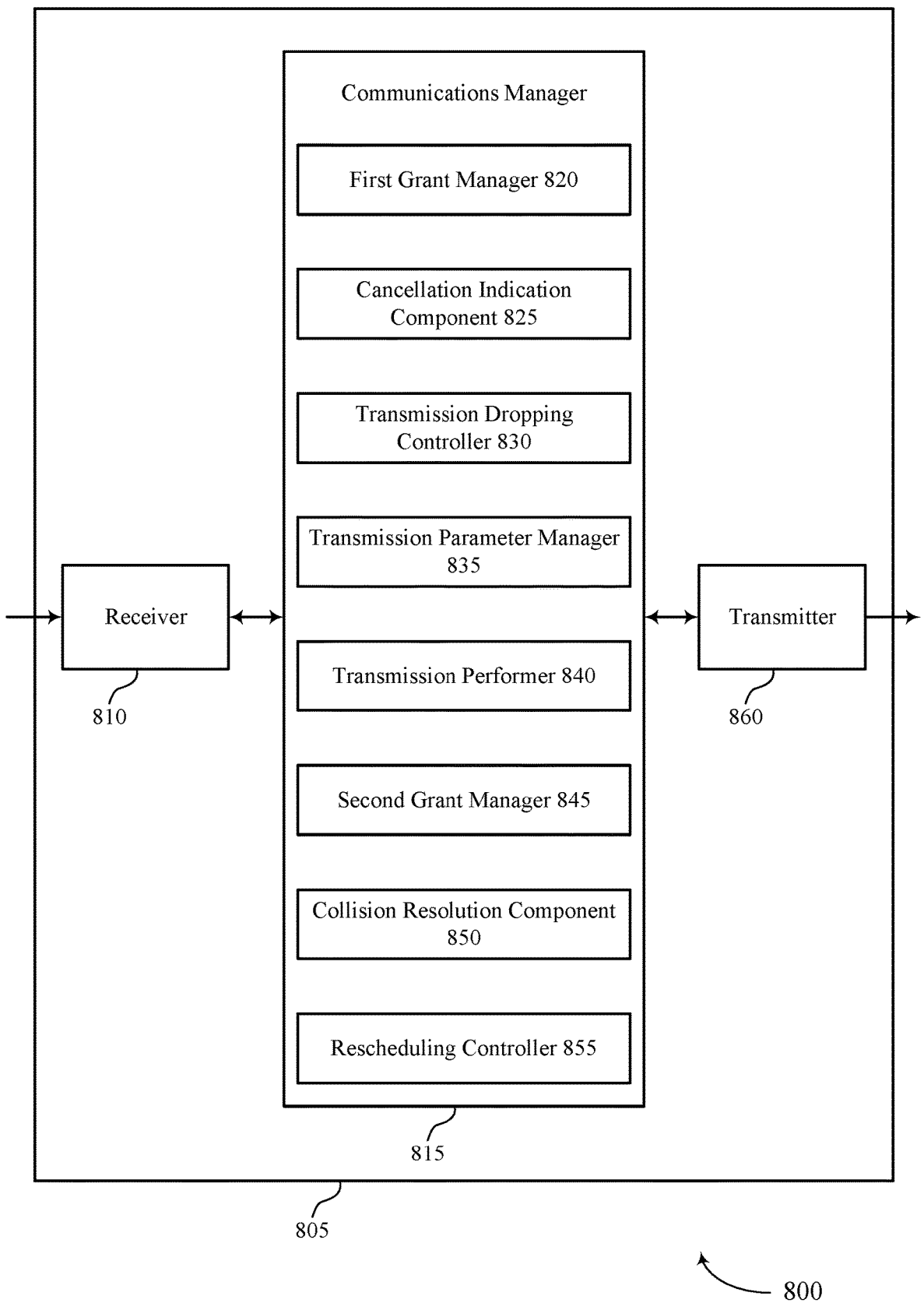

FIG. 8 shows a block diagram 800 of a device 805 that supports PHY layer and MAC layer operations following ULCI in accordance with aspects of the present disclosure. The device 805 may be an example of aspects of a device 705, or a UE 115 as described herein. The device 805 may include a receiver 810, a communications manager 815, and a transmitter 860. The device 805 may also include a processor. Each of these components may be in communication with one another (e.g., via one or more buses).

The receiver 810 may receive information such as packets, user data, or control information associated with various information channels (e.g., control channels, data channels, and information related to PHY layer and MAC layer operations following ULCI, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a first grant manager 820, a cancellation indication component 825, a transmission dropping controller 830, a transmission parameter manager 835, a transmission performer 840, a second grant manager 845, a collision resolution component 850, and a rescheduling controller 855. The communications manager 815 may be an example of aspects of the communications manager 1010 described herein.

The first grant manager 820 may receive a grant for a first transmission scheduled for a first set of resources, the first transmission associated with a first transmission parameter. The cancellation indication component 825 may receive an indication for the UE to at least partially cancel the first transmission. The transmission dropping controller 830 may drop at least a portion of the first transmission based on receiving the indication. The transmission parameter manager 835 may determine a second transmission parameter for a second transmission based on the first transmission parameter and irrespective of dropping the first transmission. The transmission performer 840 may perform or receive the second transmission according to the second transmission parameter.

The first grant manager 820 may receive a first grant for a first transmission scheduled for a first set of resources. The second grant manager 845 may receive a second grant for a second transmission scheduled for a second set of resources that overlaps with the first set of resources. The collision resolution component 850 may drop at least a portion of the first transmission based on receiving the second grant. The cancellation indication component 825 may receive an indication for the UE to at least partially cancel the second transmission. The transmission dropping controller 830 may drop at least a portion of the second transmission based on receiving the indication. The rescheduling controller 855 may refrain from rescheduling the first transmission on the first set of resources based on receiving the indication and irrespective of dropping the second transmission.

The transmitter 860 may transmit signals generated by other components of the device 805. In some examples, the transmitter 860 may be collocated with a receiver 810 in a transceiver module. For example, the transmitter 860 may be an example of aspects of the transceiver 1020 described with reference to FIG. 10. The transmitter 860 may utilize a single antenna or a set of antennas.

Figure 9:
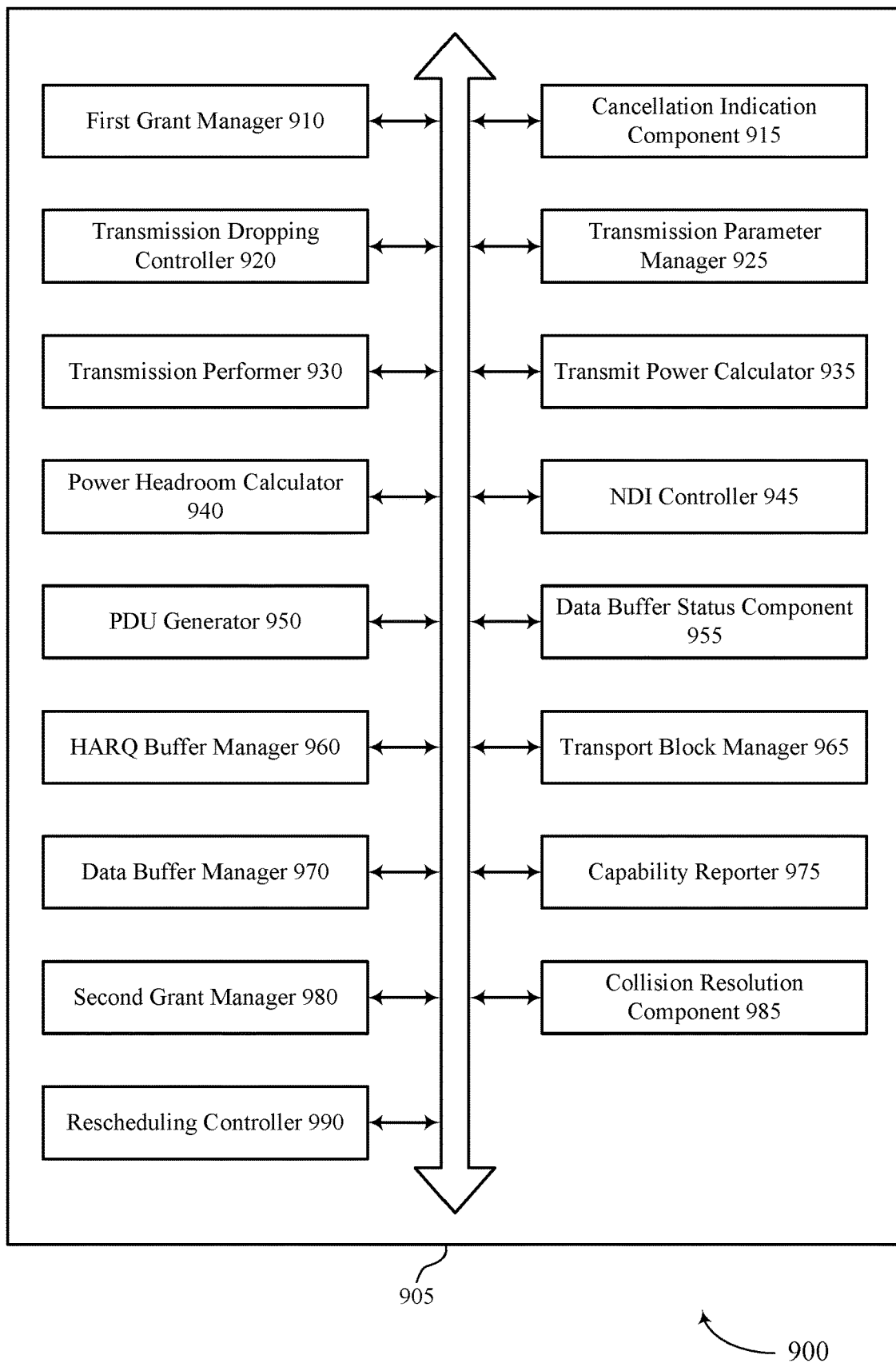
FIG. 9 shows a block diagram of a communications manager that supports PHY layer and MAC layer operations following ULCI in accordance with aspects of the present disclosure.

FIG. 9 shows a block diagram 900 of a communications manager 905 that supports PHY layer and MAC layer operations following ULCI in accordance with aspects of the present disclosure. The communications manager 905 may be an example of aspects of a communications manager 715, a communications manager 815, or a communications manager 1010 described herein. The communications manager 905 may include a first grant manager 910, a cancellation indication component 915, a transmission dropping controller 920, a transmission parameter manager 925, a transmission performer 930, a transmit power calculator 935, a power headroom calculator 940, a NDI controller 945, a PDU generator 950, a data buffer status component 955, a HARQ buffer manager 960, a transport block manager 965, a data buffer manager 970, a capability reporter 975, a second grant manager 980, a collision resolution component 985, and a rescheduling controller 990. Each of these modules may communicate, directly or indirectly, with one another (e.g., via one or more buses).

The first grant manager 910 may receive a grant for a first transmission scheduled for a first set of resources, the first transmission associated with a first transmission parameter. In some examples, the first grant manager 910 may receive a first grant for a first transmission scheduled for a first set of resources. In some cases, the UE is configured for half duplex communications, and where the grant includes radio resource control signaling for a set of flexible symbols. In some cases, the first transmission includes a physical uplink shared channel, physical uplink control channel, physical random access channel, a sounding reference signal, a physical downlink shared channel, or a channel state information reference signal.

The cancellation indication component 915 may receive an indication for the UE to at least partially cancel the first transmission. In some examples, the cancellation indication component 915 may receive an indication for the UE to at least partially cancel the second transmission. In some cases, the indication includes a slot format indicator or downlink control information. In some cases, the indication includes an uplink cancellation indication.

The transmission dropping controller 920 may drop at least a portion of the first transmission based on receiving the indication. In some examples, the transmission dropping controller 920 may drop at least a portion of the second transmission based on receiving the indication.

The transmission parameter manager 925 may determine a second transmission parameter for a second transmission based on the first transmission parameter and irrespective of dropping the first transmission.

The transmission performer 930 may perform or receive the second transmission according to the second transmission parameter. In some examples, performing or receiving the second transmission may be based on the determined toggle state of the new data indicator for the second transmission. In some examples, the transmission performer 930 may perform or receive the second transmission according to the second transmission parameter based on the capability report irrespective of dropping the first transmission. In some cases, the first transmission and the second transmission include an uplink transmission, or the first transmission and the second transmission include a downlink transmission.

In some examples, the transmission performer 930 may cancel reception of the first transmission irrespective of dropping the second transmission. In some examples, the transmission performer 930 may cancel transmission of the first transmission irrespective of dropping the second transmission. In some cases, the first transmission includes a semi-statically configured downlink transmission and the second transmission includes a dynamically scheduled uplink transmission. In some cases, the first transmission includes a first uplink transmission and the second transmission includes a second uplink transmission, and where the first grant includes a configured grant and the second grant includes a dynamic grant.

The transmit power calculator 935 may determine a first transmit power for the second transmission relative to a second transmit power of the first transmission indicated by the grant irrespective of dropping the first transmission, where the second transmission parameter for the second transmission is the first transmit power.

The power headroom calculator 940 may transmit a power headroom report based on the determined first transmit power and the second transmit power irrespective of dropping the first transmission.

The NDI controller 945 may determine a toggle state of a new data indicator for the second transmission irrespective of dropping the first transmission, where the second transmission parameter for the second transmission includes the toggle state of the new data indicator. In some examples, the NDI controller 945 may determine the toggle state of the new data indicator for the second transmission is based on a difference between a first new data indicator associated with the first transmission indicated by the grant and a second new data indicator associated with the second transmission.

The PDU generator 950 may generate, at a media access control layer, a protocol data unit based on receiving the grant.

The data buffer status component 955 may determine a buffer status of a data buffer at the media access control layer based on the first set of resources and irrespective of dropping the first transmission.

The HARQ buffer manager 960 may transfer the protocol data unit from the data buffer at the media access control layer to a hybrid automatic repeat request buffer at a physical layer based on the first set of resources and irrespective of dropping the first transmission.

The transport block manager 965 may store a transport block of the protocol data unit in the hybrid automatic repeat request buffer at the physical layer.

The data buffer manager 970 may refrain from restoring the protocol data unit in the data buffer at the media access control layer irrespective of dropping the second transmission.

The capability reporter 975 may determine a capability report indicating a number of receptions the UE is capable of receiving in a slot or indicating a number of transmissions the UE is capable of performing in the slot.

The second grant manager 980 may receive a second grant for a second transmission scheduled for a second set of resources that overlaps with the first set of resources.

The collision resolution component 985 may drop at least a portion of the first transmission based on receiving the second grant.

The rescheduling controller 990 may refrain from rescheduling the first transmission on the first set of resources based on receiving the indication and irrespective of dropping the second transmission.

Figure 10:
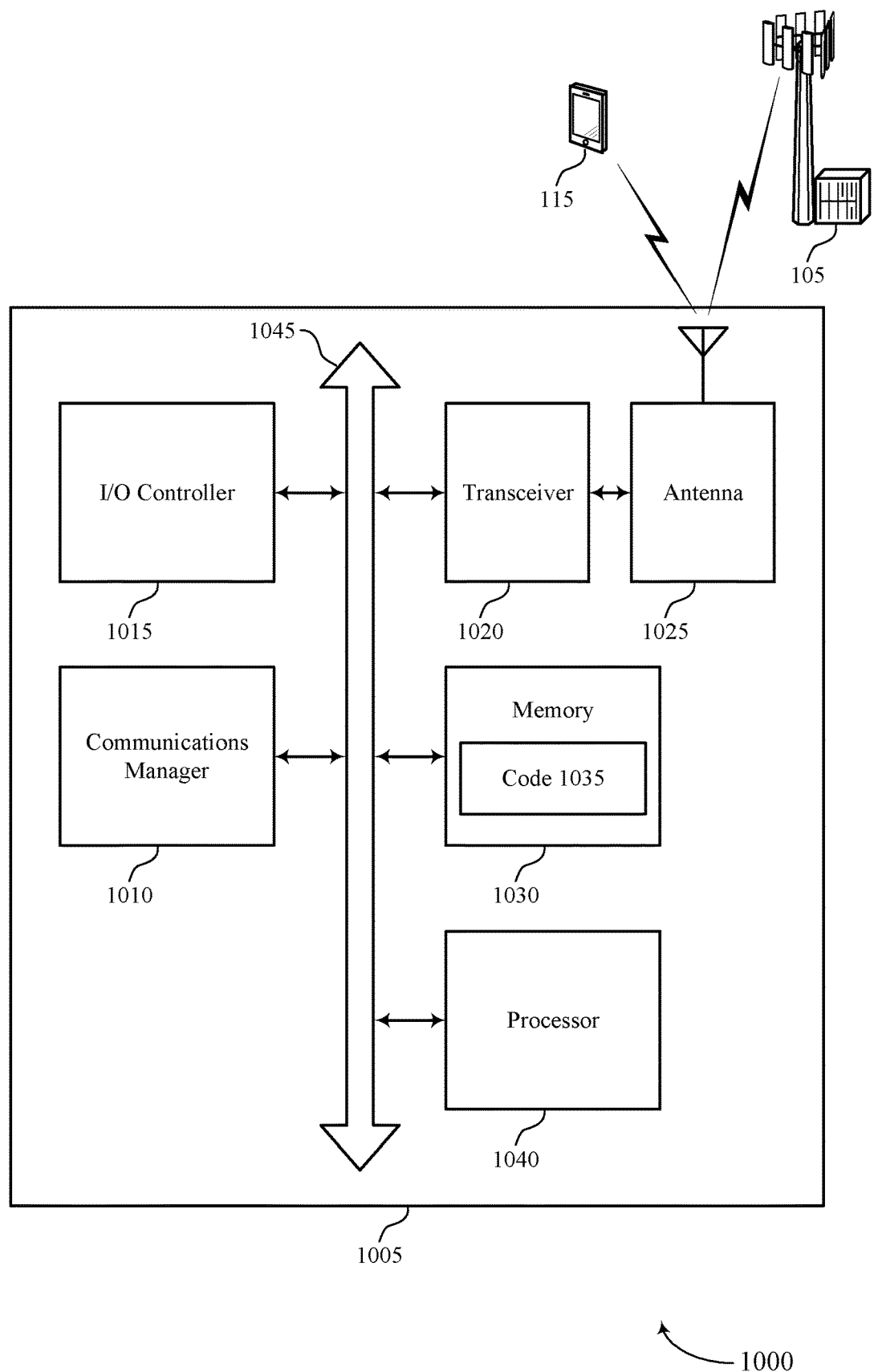
FIG. 10 shows a diagram of a system including a device that supports PHY layer and MAC layer operations following ULCI in accordance with aspects of the present disclosure.

FIG. 10 shows a diagram of a system 1000 including a device 1005 that supports PHY layer and MAC layer operations following ULCI in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a grant for a first transmission scheduled for a first set of resources, the first transmission associated with a first transmission parameter, receive an indication for the UE to at least partially cancel the first transmission, drop at least a portion of the first transmission based on receiving the indication, determine a second transmission parameter for a second transmission based on the first transmission parameter and irrespective of dropping the first transmission, and perform or receive the second transmission according to the second transmission parameter. The communications manager 1010 may also receive a first grant for a first transmission scheduled for a first set of resources, receive a second grant for a second transmission scheduled for a second set of resources that overlaps with the first set of resources, drop at least a portion of the first transmission based on receiving the second grant, receive an indication for the UE to at least partially cancel the second transmission, drop at least a portion of the second transmission based on receiving the indication, and refrain from rescheduling the first transmission on the first set of resources based on receiving the indication and irrespective of dropping the second transmission.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting PHY layer and MAC layer operations following ULCI).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040, but may cause a computer (e.g., when compiled and executed) to perform functions described herein.

Figure 11:
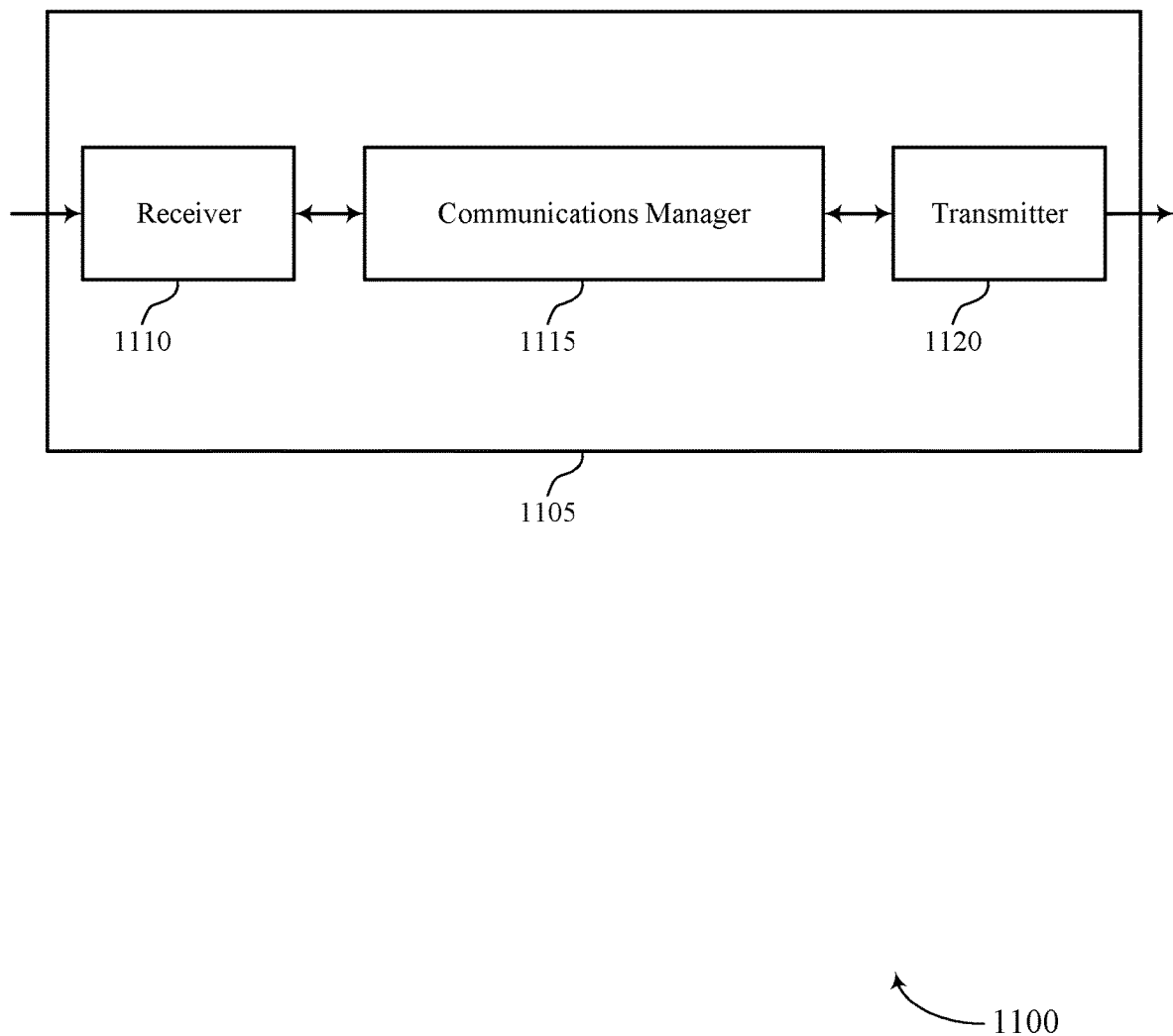
FIGS. 11 and 12 show block diagrams of devices that support PHY layer and MAC layer operations following ULCI in accordance with aspects of the present disclosure.

FIG. 11 shows a block diagram 1100 of a device 1105 that supports PHY layer and MAC layer operations following ULCI in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to PHY layer and MAC layer operations following ULCI, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE, a grant for a first transmission scheduled for a first set of resources, the first transmission associated with a first transmission parameter, transmit an indication for the UE to at least partially cancel the first transmission based on a second transmission scheduled for a second set of resources that overlaps with the first set of resources, determine a second transmission parameter for a third transmission based on the first transmission parameter, and perform or receive the third transmission according to the second transmission parameter. The communications manager 1115 may also transmit a first grant for a first transmission scheduled for a first set of resources, transmit a second grant for a second transmission scheduled for a second set of resources that overlaps with the first set of resources, transmit an indication for the UE to at least partially cancel the second transmission based on a third transmission scheduled for a third set of resources that overlaps with the second set of resources, and refrain from rescheduling the first transmission on the first set of resources based on transmitting the indication. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including, but not limited to, an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
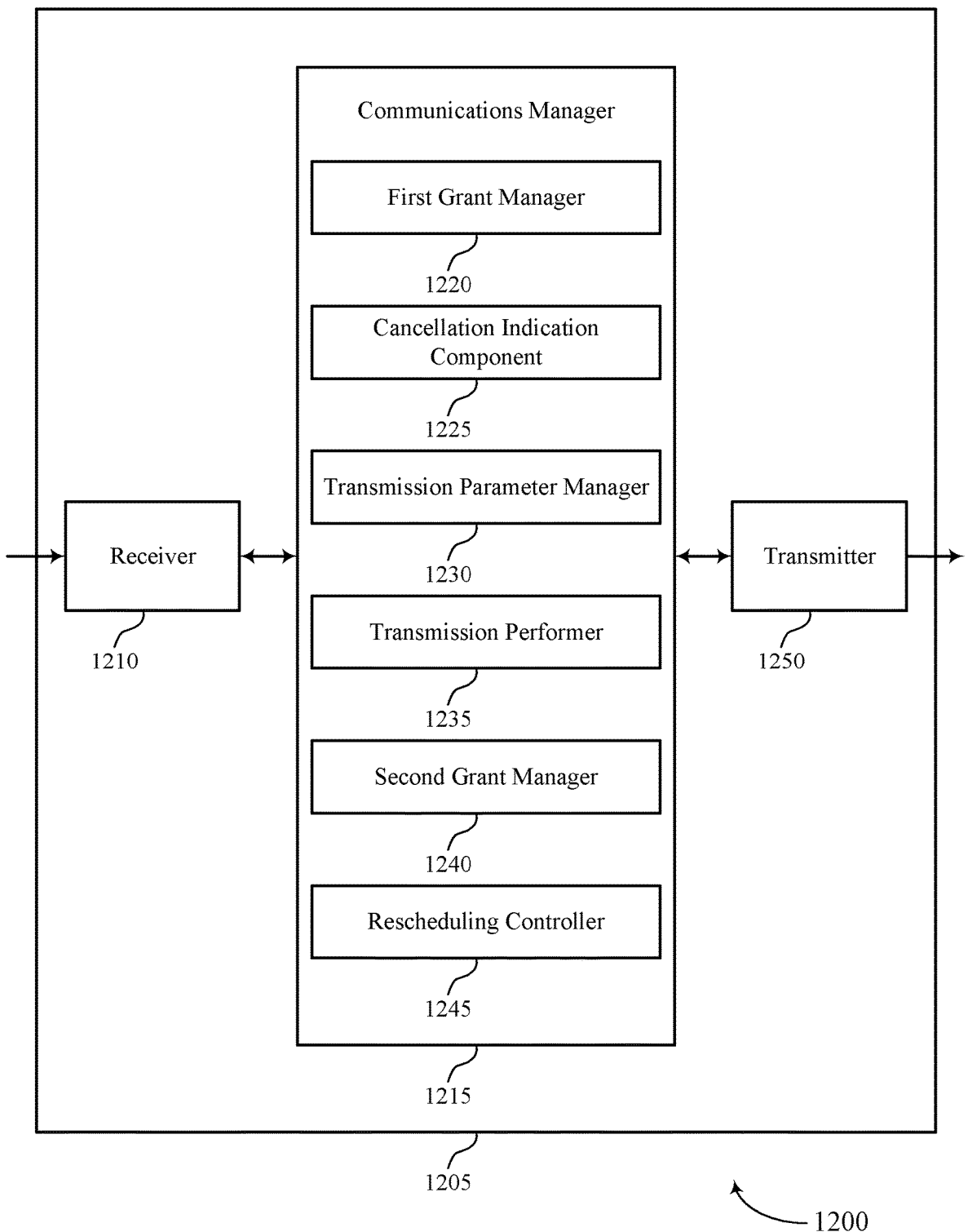

FIG. 12 shows a block diagram 1200 of a device 1205 that supports PHY layer and MAC layer operations following ULCI in accordance with aspects of the present disclosure. The device 1205 may be an example of aspects of a device 1105, or a base station 105 as described herein. The device 1205 may include a receiver 1210, a communications manager 1215, and a transmitter 1250. The device 1205 may also include a processor. Each of these components may be in communication with one another (e.g., via one or more buses).

The receiver 1210 may receive information such as packets, user data, or control information associated with various information channels (e.g., control channels, data channels, and information related to PHY layer and MAC layer operations following ULCI, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a first grant manager 1220, a cancellation indication component 1225, a transmission parameter manager 1230, a transmission performer 1235, a second grant manager 1240, and a rescheduling controller 1245. The communications manager 1215 may be an example of aspects of the communications manager 1410 described herein.

The first grant manager 1220 may transmit, to a UE, a grant for a first transmission scheduled for a first set of resources, the first transmission associated with a first transmission parameter. The cancellation indication component 1225 may transmit an indication for the UE to at least partially cancel the first transmission based on a second transmission scheduled for a second set of resources that overlaps with the first set of resources. The transmission parameter manager 1230 may determine a second transmission parameter for a third transmission based on the first transmission parameter. The transmission performer 1235 may perform or receive the third transmission according to the second transmission parameter.

The first grant manager 1220 may transmit a first grant for a first transmission scheduled for a first set of resources. The second grant manager 1240 may transmit a second grant for a second transmission scheduled for a second set of resources that overlaps with the first set of resources. The cancellation indication component 1225 may transmit an indication for the UE to at least partially cancel the second transmission based on a third transmission scheduled for a third set of resources that overlaps with the second set of resources. The rescheduling controller 1245 may refrain from rescheduling the first transmission on the first set of resources based on transmitting the indication.

The transmitter 1250 may transmit signals generated by other components of the device 1205. In some examples, the transmitter 1250 may be collocated with a receiver 1210 in a transceiver module. For example, the transmitter 1250 may be an example of aspects of the transceiver 1420 described with reference to FIG. 14. The transmitter 1250 may utilize a single antenna or a set of antennas.

Figure 13:
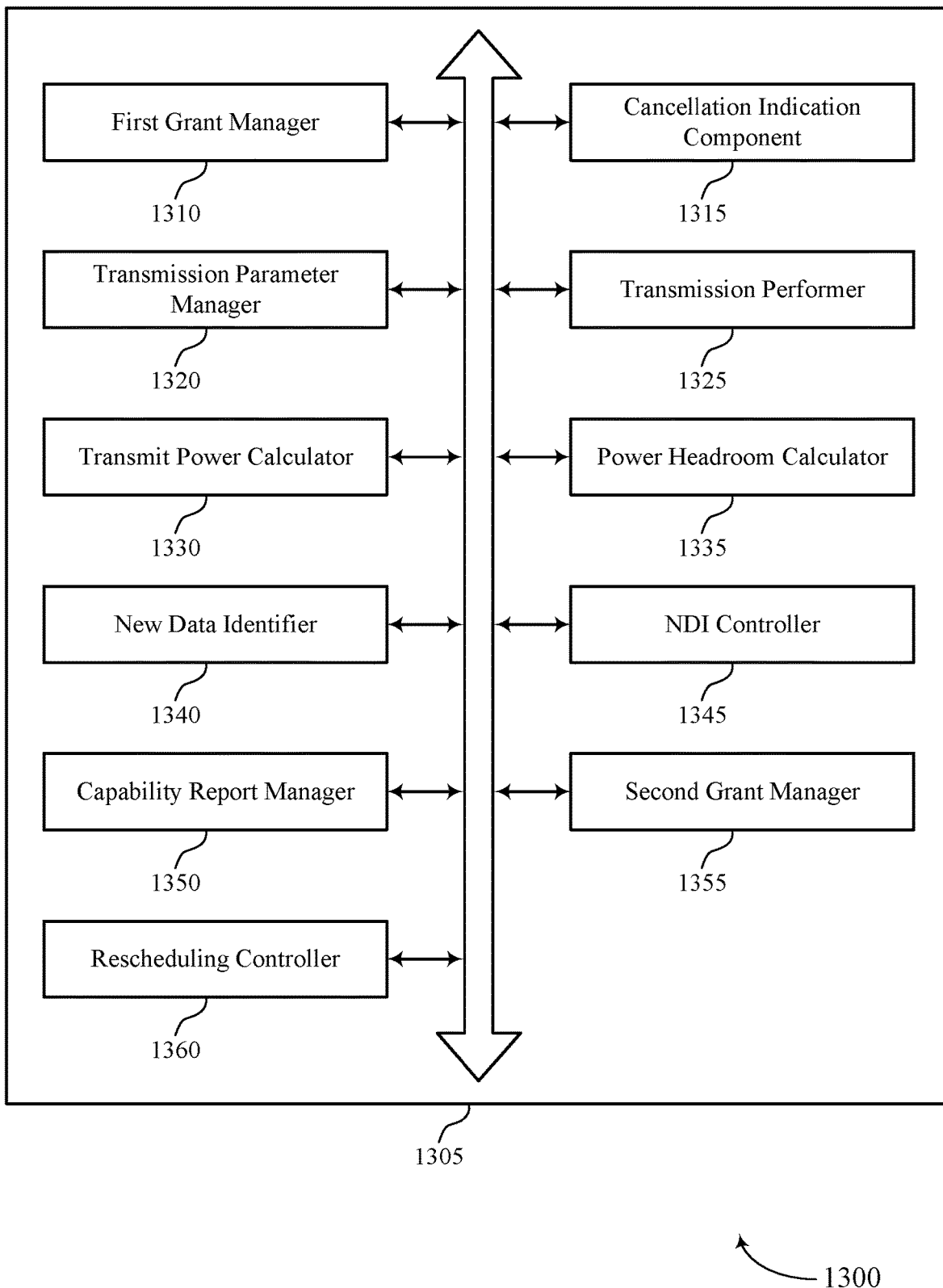
FIG. 13 shows a block diagram of a communications manager that supports PHY layer and MAC layer operations following ULCI in accordance with aspects of the present disclosure.

FIG. 13 shows a block diagram 1300 of a communications manager 1305 that supports PHY layer and MAC layer operations following ULCI in accordance with aspects of the present disclosure. The communications manager 1305 may be an example of aspects of a communications manager 1115, a communications manager 1215, or a communications manager 1410 described herein. The communications manager 1305 may include a first grant manager 1310, a cancellation indication component 1315, a transmission parameter manager 1320, a transmission performer 1325, a transmit power calculator 1330, a power headroom calculator 1335, a new data identifier 1340, a NDI controller 1345, a capability report manager 1350, a second grant manager 1355, and a rescheduling controller 1360. Each of these modules may communicate, directly or indirectly, with one another (e.g., via one or more buses).

The first grant manager 1310 may transmit, to a UE, a grant for a first transmission scheduled for a first set of resources, the first transmission associated with a first transmission parameter. In some examples, the first grant manager 1310 may transmit a first grant for a first transmission scheduled for a first set of resources. In some cases, the UE is configured for half duplex communications, and where the grant includes radio resource control signaling for a set of flexible symbols. In some cases, the first transmission includes a physical uplink shared channel, physical uplink control channel, physical random access channel, a sounding reference signal, a physical downlink shared channel, or a channel state information reference signal.

The cancellation indication component 1315 may transmit an indication for the UE to at least partially cancel the first transmission based on a second transmission scheduled for a second set of resources that overlaps with the first set of resources. In some examples, the cancellation indication component 1315 may transmit an indication for the UE to at least partially cancel the second transmission based on a third transmission scheduled for a third set of resources that overlaps with the second set of resources. In some cases, the indication includes a slot format indicator or downlink control information. In some cases, the indication includes an uplink cancellation indication.

The transmission parameter manager 1320 may determine a second transmission parameter for a third transmission based on the first transmission parameter.

The transmission performer 1325 may perform or receive the third transmission according to the second transmission parameter. In some examples, the transmission performer 1325 may perform or receive the third transmission according to the second transmission parameter based on the capability report irrespective of the indication. In some cases, the first transmission and the third transmission include an uplink transmission and the second transmission includes a downlink transmission, or the first transmission and the third transmission include a downlink transmission and the second transmission includes an uplink transmission.

In some examples, the transmission performer 1325 may cancel transmission of the first transmission irrespective of the indication. In some examples, the transmission performer 1325 may cancel reception of the first transmission irrespective of the indication. In some cases, the first transmission includes a semi-statically configured downlink transmission and the second transmission includes a dynamically scheduled uplink transmission. In some cases, the first transmission includes a first uplink transmission and the second transmission includes a second uplink transmission, and where the first grant includes a configured grant and the second grant includes a dynamic grant.

The transmit power calculator 1330 may determine a first transmit power for the third transmission relative to a second transmit power of the first transmission indicated by the grant irrespective of the indication, where the second transmission parameter for the third transmission is the first transmit power.

The power headroom calculator 1335 may receive a power headroom report including a first transmit power of the first transmission and a second transmit power of the third transmission irrespective of the indication.

The new data identifier 1340 may determine whether the third transmission includes new data with respect to the first transmission irrespective of the indication.

The NDI controller 1345 may determine a toggle state of a new data indicator for the third transmission based on determining whether the third transmission includes the new data, where the second transmission parameter for the third transmission includes the toggle state of the new data indicator.

The capability report manager 1350 may receive a capability report indicating a number of receptions that the UE is capable of receiving in a slot or indicating a number of transmissions the UE is capable of performing in the slot.

The second grant manager 1355 may transmit a second grant for a second transmission scheduled for a second set of resources that overlaps with the first set of resources.

The rescheduling controller 1360 may refrain from rescheduling the first transmission on the first set of resources based on transmitting the indication.

Figure 14:
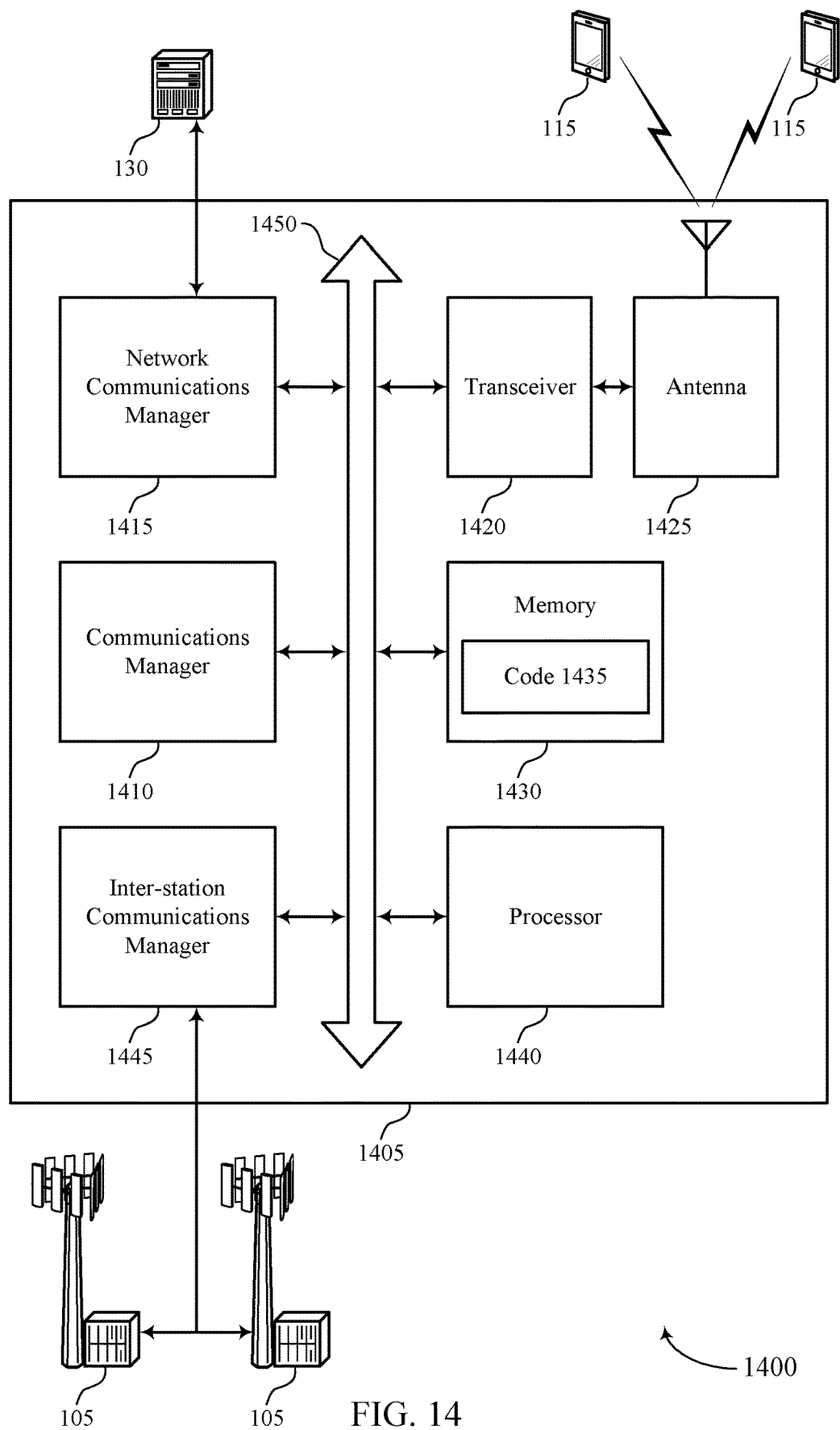
FIG. 14 shows a diagram of a system including a device that supports PHY layer and MAC layer operations following ULCI in accordance with aspects of the present disclosure.

FIG. 14 shows a diagram of a system 1400 including a device 1405 that supports PHY layer and MAC layer operations following ULCI in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a UE, a grant for a first transmission scheduled for a first set of resources, the first transmission associated with a first transmission parameter, transmit an indication for the UE to at least partially cancel the first transmission based on a second transmission scheduled for a second set of resources that overlaps with the first set of resources, determine a second transmission parameter for a third transmission based on the first transmission parameter, and perform or receive the third transmission according to the second transmission parameter. The communications manager 1410 may also transmit a first grant for a first transmission scheduled for a first set of resources, transmit a second grant for a second transmission scheduled for a second set of resources that overlaps with the first set of resources, transmit an indication for the UE to at least partially cancel the second transmission based on a third transmission scheduled for a third set of resources that overlaps with the second set of resources, and refrain from rescheduling the first transmission on the first set of resources based on transmitting the indication.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting PHY layer and MAC layer operations following ULCI).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440, but may cause a computer (e.g., when compiled and executed) to perform functions described herein.

Figure 15:
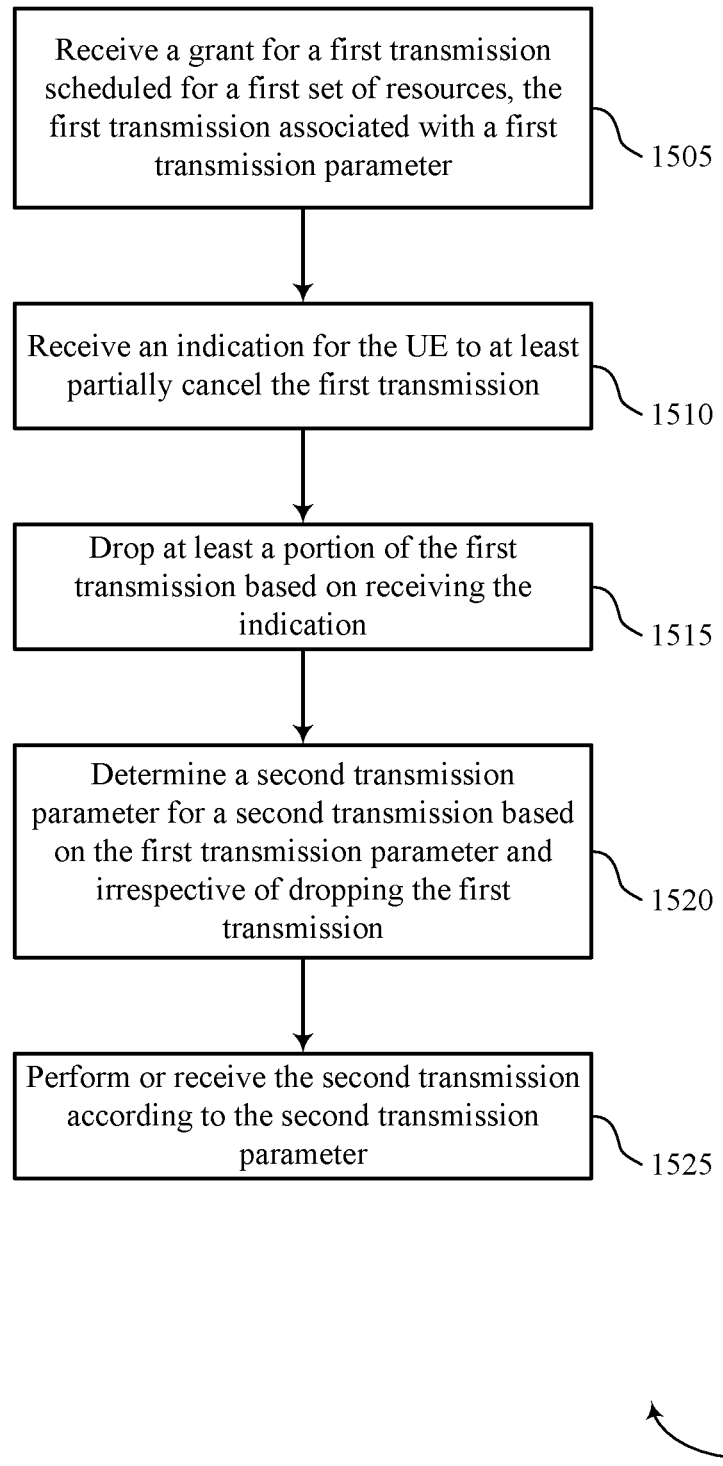
FIGS. 15 through 20 show flowcharts illustrating methods that support PHY layer and MAC layer operations following ULCI in accordance with aspects of the present disclosure.

FIG. 15 shows a flowchart illustrating a method 1500 that supports PHY layer and MAC layer operations following ULCI in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1505, the UE may receive a grant for a first transmission scheduled for a first set of resources, the first transmission associated with a first transmission parameter. The operations of 1505 may be performed according to the methods described herein. In some examples, aspects of the operations of 1505 may be performed by a first grant manager as described with reference to FIGS. 7 through 10.

At 1510, the UE may receive an indication for the UE to at least partially cancel the first transmission. The operations of 1510 may be performed according to the methods described herein. In some examples, aspects of the operations of 1510 may be performed by a cancellation indication component as described with reference to FIGS. 7 through 10.

At 1515, the UE may drop at least a portion of the first transmission based on receiving the indication. The operations of 1515 may be performed according to the methods described herein. In some examples, aspects of the operations of 1515 may be performed by a transmission dropping controller as described with reference to FIGS. 7 through 10.

At 1520, the UE may determine a second transmission parameter for a second transmission based on the first transmission parameter and irrespective of dropping the first transmission. The operations of 1520 may be performed according to the methods described herein. In some examples, aspects of the operations of 1520 may be performed by a transmission parameter manager as described with reference to FIGS. 7 through 10.

At 1525, the UE may perform or receive the second transmission according to the second transmission parameter. The operations of 1525 may be performed according to the methods described herein. In some examples, aspects of the operations of 1525 may be performed by a transmission performer as described with reference to FIGS. 7 through 10.

Figure 16:
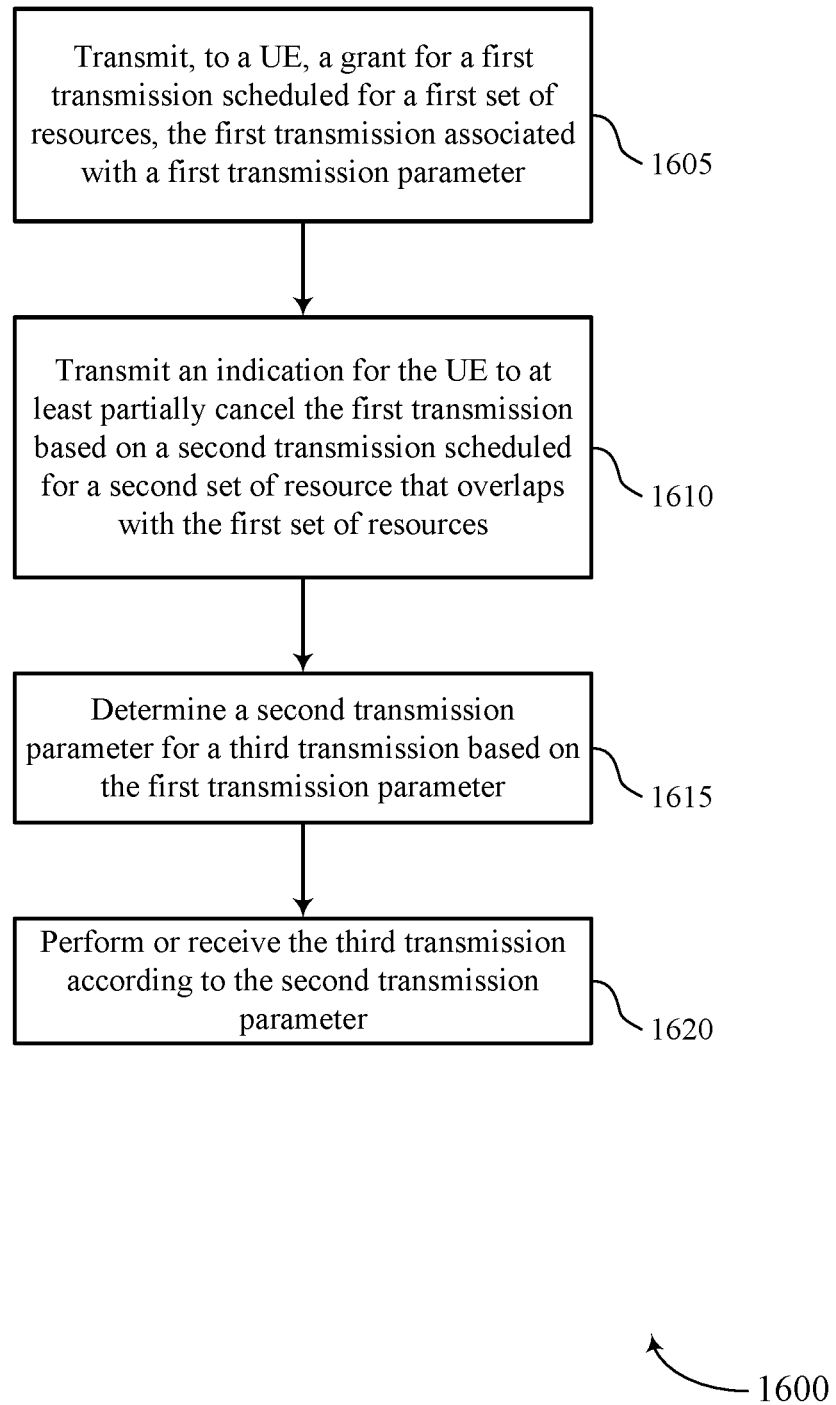

FIG. 16 shows a flowchart illustrating a method 1600 that supports PHY layer and MAC layer operations following ULCI in accordance with aspects of the present disclosure. The operations of method 1600 may be implemented by a base station 105 or its components as described herein. For example, the operations of method 1600 may be performed by a communications manager as described with reference to FIGS. 11 through 14. In some examples, a base station may execute a set of instructions to control the functional elements of the base station to perform the functions described herein. Additionally, or alternatively, a base station may perform aspects of the functions described herein using special-purpose hardware.

At 1605, the base station may transmit, to a UE, a grant for a first transmission scheduled for a first set of resources, the first transmission associated with a first transmission parameter. The operations of 1605 may be performed according to the methods described herein. In some examples, aspects of the operations of 1605 may be performed by a first grant manager as described with reference to FIGS. 11 through 14.

At 1610, the base station may transmit an indication for the UE to at least partially cancel the first transmission based on a second transmission scheduled for a second set of resources that overlaps with the first set of resources. The operations of 1610 may be performed according to the methods described herein. In some examples, aspects of the operations of 1610 may be performed by a cancellation indication component as described with reference to FIGS. 11 through 14.

At 1615, the base station may determine a second transmission parameter for a third transmission based on the first transmission parameter. The operations of 1615 may be performed according to the methods described herein. In some examples, aspects of the operations of 1615 may be performed by a transmission parameter manager as described with reference to FIGS. 11 through 14.

At 1620, the base station may perform or receive the third transmission according to the second transmission parameter. The operations of 1620 may be performed according to the methods described herein. In some examples, aspects of the operations of 1620 may be performed by a transmission performer as described with reference to FIGS. 11 through 14.

Figure 17:
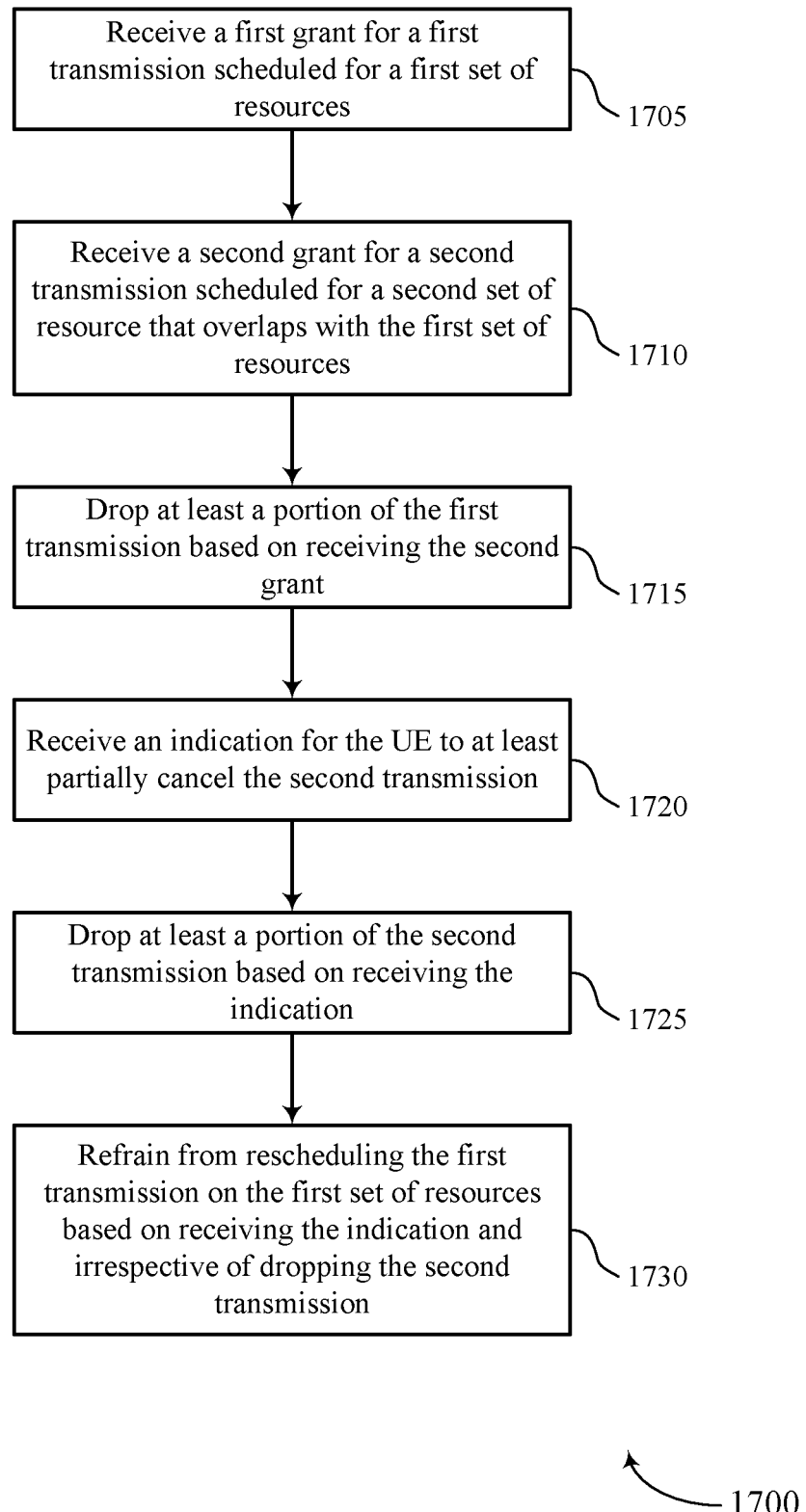

FIG. 17 shows a flowchart illustrating a method 1700 that supports PHY layer and MAC layer operations following ULCI in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1705, the UE may receive a first grant for a first transmission scheduled for a first set of resources. The operations of 1705 may be performed according to the methods described herein. In some examples, aspects of the operations of 1705 may be performed by a first grant manager as described with reference to FIGS. 7 through 10.

At 1710, the UE may receive a second grant for a second transmission scheduled for a second set of resources that overlaps with the first set of resources. The operations of 1710 may be performed according to the methods described herein. In some examples, aspects of the operations of 1710 may be performed by a second grant manager as described with reference to FIGS. 7 through 10.

At 1715, the UE may drop at least a portion of the first transmission based on receiving the second grant. The operations of 1715 may be performed according to the methods described herein. In some examples, aspects of the operations of 1715 may be performed by a collision resolution component as described with reference to FIGS. 7 through 10.

At 1720, the UE may receive an indication for the UE to at least partially cancel the second transmission. The operations of 1720 may be performed according to the methods described herein. In some examples, aspects of the operations of 1720 may be performed by a cancellation indication component as described with reference to FIGS. 7 through 10.

At 1725, the UE may drop at least a portion of the second transmission based on receiving the indication. The operations of 1725 may be performed according to the methods described herein. In some examples, aspects of the operations of 1725 may be performed by a transmission dropping controller as described with reference to FIGS. 7 through 10.

At 1730, the UE may refrain from rescheduling the first transmission on the first set of resources based on receiving the indication and irrespective of dropping the second transmission. The operations of 1730 may be performed according to the methods described herein. In some examples, aspects of the operations of 1730 may be performed by a rescheduling controller as described with reference to FIGS. 7 through 10.

Figure 18:
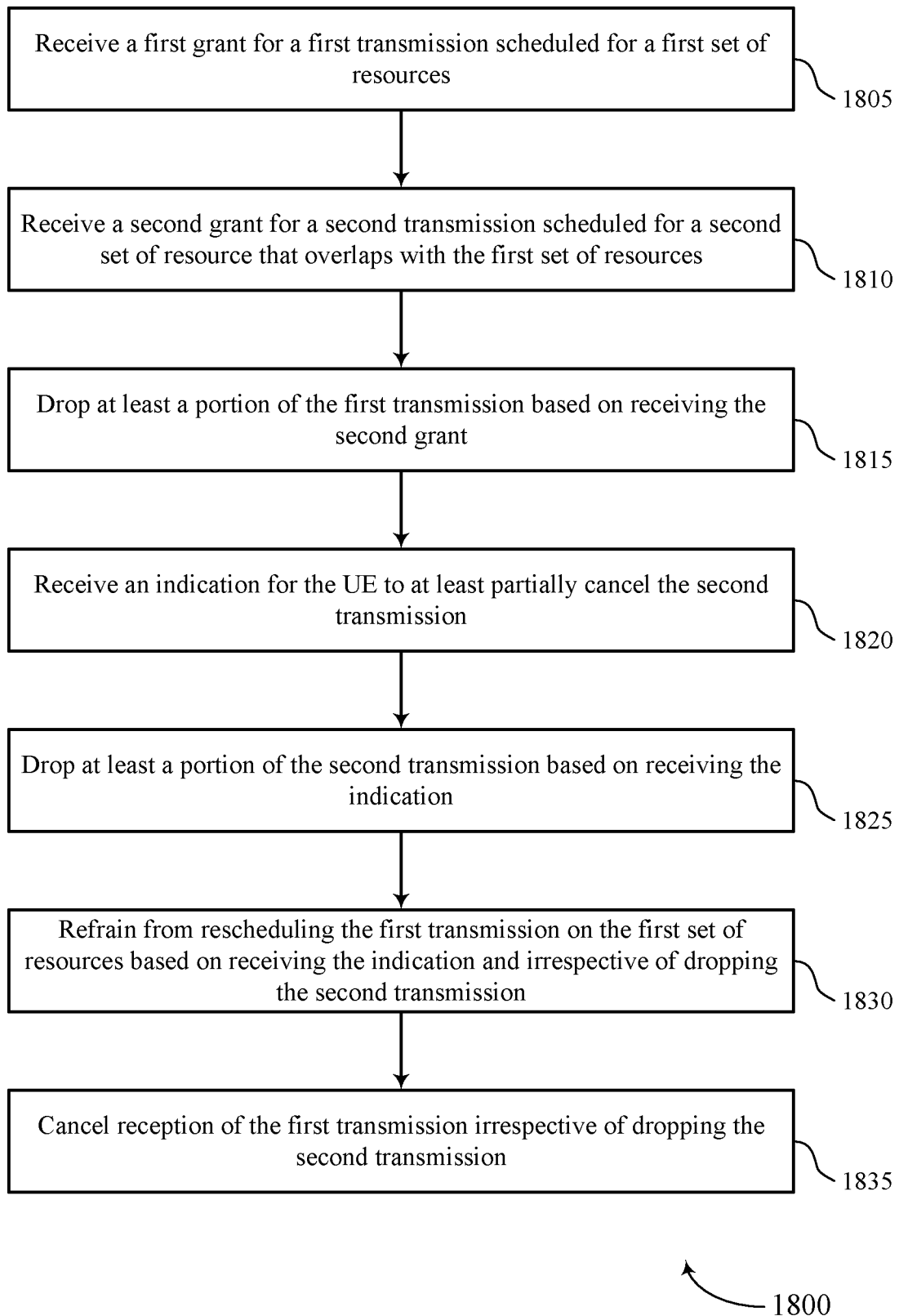

FIG. 18 shows a flowchart illustrating a method 1800 that supports PHY layer and MAC layer operations following ULCI in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1805, the UE may receive a first grant for a first transmission scheduled for a first set of resources. The operations of 1805 may be performed according to the methods described herein. In some examples, aspects of the operations of 1805 may be performed by a first grant manager as described with reference to FIGS. 7 through 10.

At 1810, the UE may receive a second grant for a second transmission scheduled for a second set of resources that overlaps with the first set of resources. The operations of 1810 may be performed according to the methods described herein. In some examples, aspects of the operations of 1810 may be performed by a second grant manager as described with reference to FIGS. 7 through 10.

At 1815, the UE may drop at least a portion of the first transmission based on receiving the second grant. The operations of 1815 may be performed according to the methods described herein. In some examples, aspects of the operations of 1815 may be performed by a collision resolution component as described with reference to FIGS. 7 through 10.

At 1820, the UE may receive an indication for the UE to at least partially cancel the second transmission. The operations of 1820 may be performed according to the methods described herein. In some examples, aspects of the operations of 1820 may be performed by a cancellation indication component as described with reference to FIGS. 7 through 10.

At 1825, the UE may drop at least a portion of the second transmission based on receiving the indication. The operations of 1825 may be performed according to the methods described herein. In some examples, aspects of the operations of 1825 may be performed by a transmission dropping controller as described with reference to FIGS. 7 through 10.

At 1830, the UE may refrain from rescheduling the first transmission on the first set of resources based on receiving the indication and irrespective of dropping the second transmission. The operations of 1830 may be performed according to the methods described herein. In some examples, aspects of the operations of 1830 may be performed by a rescheduling controller as described with reference to FIGS. 7 through 10.

At 1835, the UE may cancel reception of the first transmission irrespective of dropping the second transmission. The operations of 1835 may be performed according to the methods described herein. In some examples, aspects of the operations of 1835 may be performed by a transmission performer as described with reference to FIGS. 7 through 10.

Figure 19:
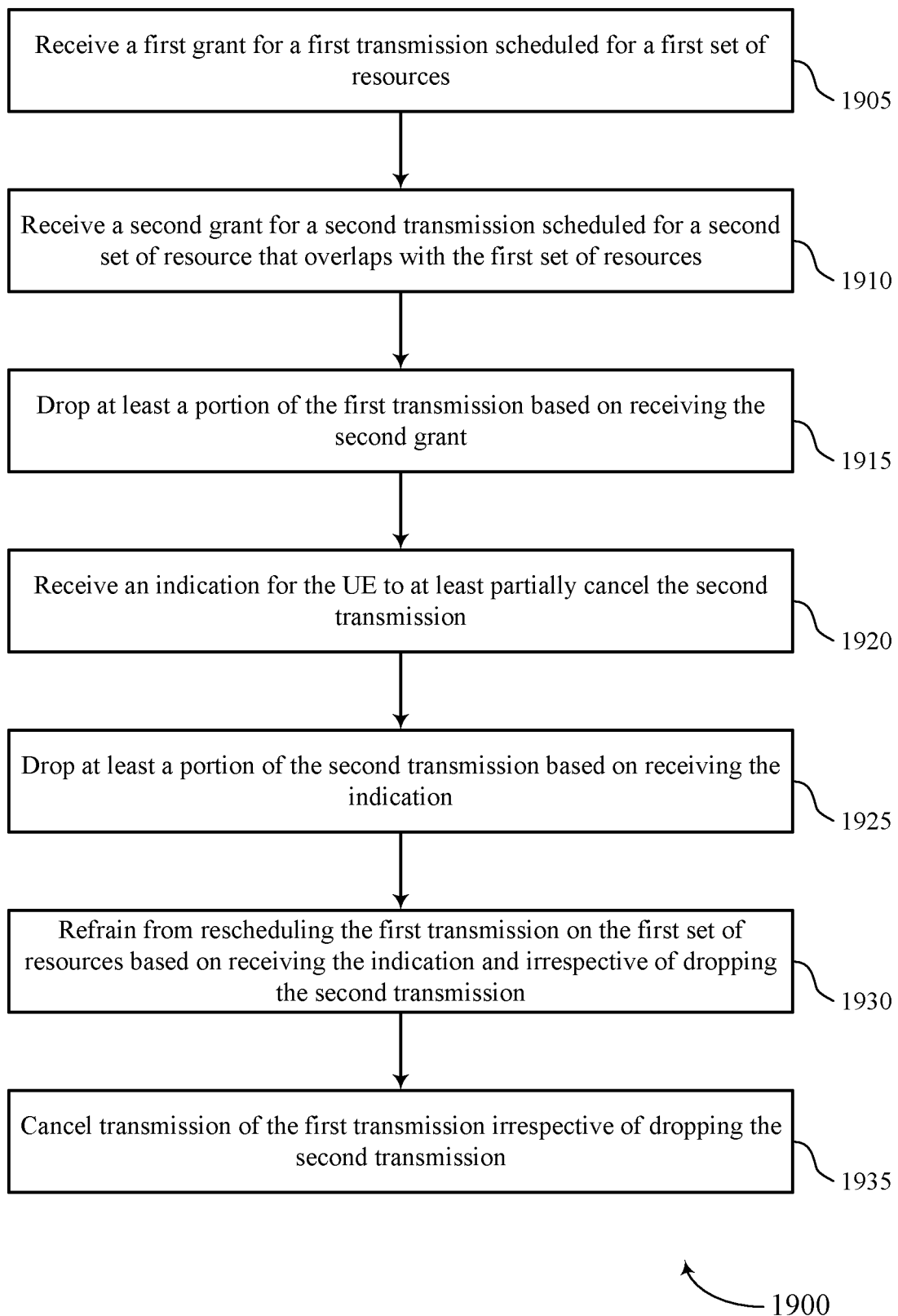

FIG. 19 shows a flowchart illustrating a method 1900 that supports PHY layer and MAC layer operations following ULCI in accordance with aspects of the present disclosure. The operations of method 1900 may be implemented by a UE 115 or its components as described herein. For example, the operations of method 1900 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1905, the UE may receive a first grant for a first transmission scheduled for a first set of resources. The operations of 1905 may be performed according to the methods described herein. In some examples, aspects of the operations of 1905 may be performed by a first grant manager as described with reference to FIGS. 7 through 10.

At 1910, the UE may receive a second grant for a second transmission scheduled for a second set of resources that overlaps with the first set of resources. The operations of 1910 may be performed according to the methods described herein. In some examples, aspects of the operations of 1910 may be performed by a second grant manager as described with reference to FIGS. 7 through 10.

At 1915, the UE may drop at least a portion of the first transmission based on receiving the second grant. The operations of 1915 may be performed according to the methods described herein. In some examples, aspects of the operations of 1915 may be performed by a collision resolution component as described with reference to FIGS. 7 through 10.

At 1920, the UE may receive an indication for the UE to at least partially cancel the second transmission. The operations of 1920 may be performed according to the methods described herein. In some examples, aspects of the operations of 1920 may be performed by a cancellation indication component as described with reference to FIGS. 7 through 10.

At 1925, the UE may drop at least a portion of the second transmission based on receiving the indication. The operations of 1925 may be performed according to the methods described herein. In some examples, aspects of the operations of 1925 may be performed by a transmission dropping controller as described with reference to FIGS. 7 through 10.

At 1930, the UE may refrain from rescheduling the first transmission on the first set of resources based on receiving the indication and irrespective of dropping the second transmission. The operations of 1930 may be performed according to the methods described herein. In some examples, aspects of the operations of 1930 may be performed by a rescheduling controller as described with reference to FIGS. 7 through 10.

At 1935, the UE may cancel transmission of the first transmission irrespective of dropping the second transmission. The operations of 1935 may be performed according to the methods described herein. In some examples, aspects of the operations of 1935 may be performed by a transmission performer as described with reference to FIGS. 7 through 10.

Figure 20:
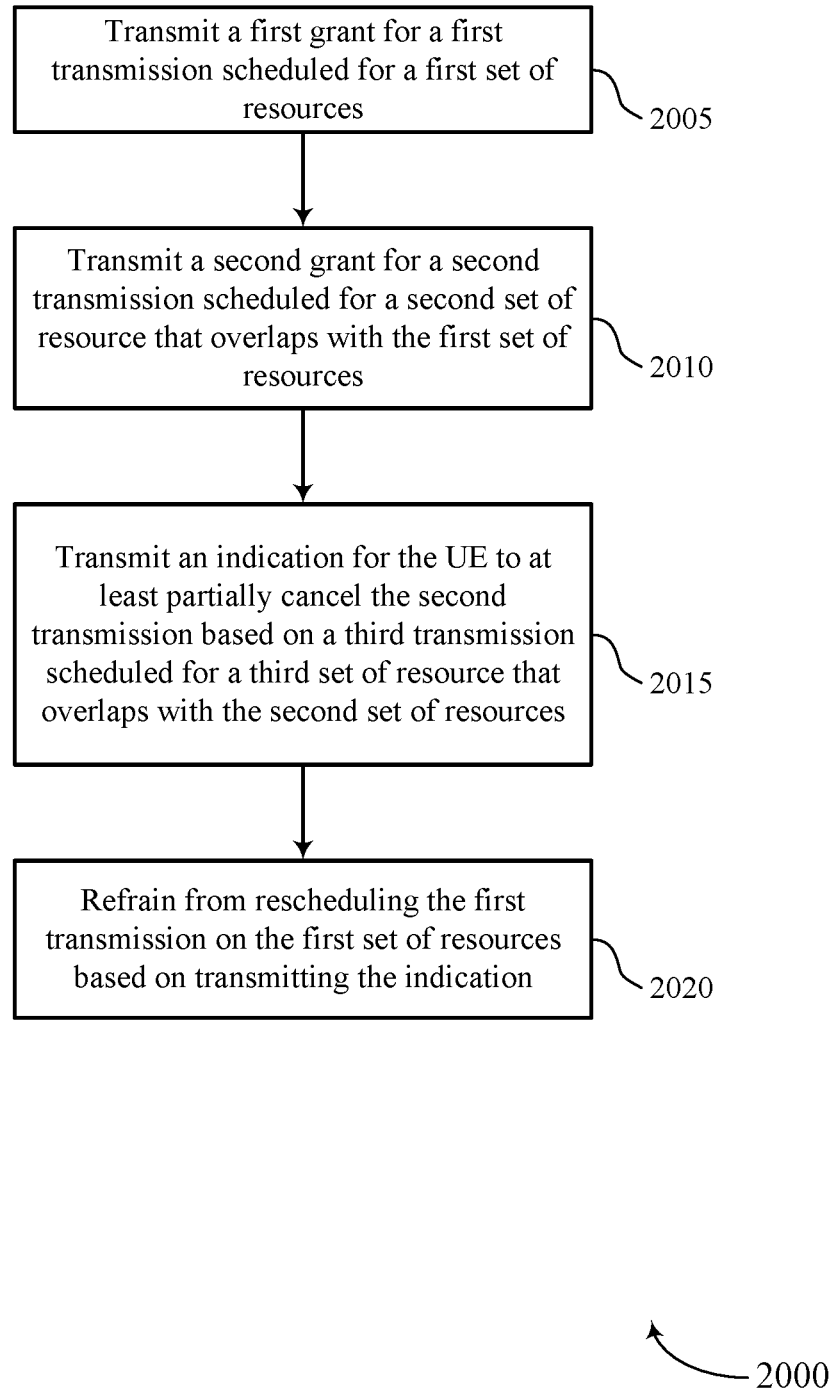

FIG. 20 shows a flowchart illustrating a method 2000 that supports PHY layer and MAC layer operations following ULCI in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described herein. Additionally, or alternatively, a base station may perform aspects of the functions described herein using special-purpose hardware.

At 2005, the base station may transmit a first grant for a first transmission scheduled for a first set of resources. The operations of 2005 may be performed according to the methods described herein. In some examples, aspects of the operations of 2005 may be performed by a first grant manager as described with reference to FIGS. 11 through 14.

At 2010, the base station may transmit a second grant for a second transmission scheduled for a second set of resources that overlaps with the first set of resources. The operations of 2010 may be performed according to the methods described herein. In some examples, aspects of the operations of 2010 may be performed by a second grant manager as described with reference to FIGS. 11 through 14.

At 2015, the base station may transmit an indication for the UE to at least partially cancel the second transmission based on a third transmission scheduled for a third set of resources that overlaps with the second set of resources. The operations of 2015 may be performed according to the methods described herein. In some examples, aspects of the operations of 2015 may be performed by a cancellation indication component as described with reference to FIGS. 11 through 14.

At 2020, the base station may refrain from rescheduling the first transmission on the first set of resources based on transmitting the indication. The operations of 2020 may be performed according to the methods described herein. In some examples, aspects of the operations of 2020 may be performed by a rescheduling controller as described with reference to FIGS. 11 through 14.

The following provides an overview of aspects of the present disclosure:

Aspect 1: A method for wireless communications at a UE, comprising: receiving a grant for a first transmission scheduled for a first set of resources, the first transmission associated with a first transmission parameter; receiving an indication for the UE to at least partially cancel the first transmission; dropping at least a portion of the first transmission based at least in part on receiving the indication; determining a second transmission parameter for a second transmission based at least in part on the first transmission parameter and irrespective of dropping the first transmission; and performing or receiving the second transmission according to the second transmission parameter.

Aspect 2: The method of aspect 1, wherein determining the second transmission parameter for the second transmission further comprises: determining a first transmit power for the second transmission relative to a second transmit power of the first transmission indicated by the grant irrespective of dropping the first transmission, wherein the second transmission parameter for the second transmission is the first transmit power.

Aspect 3: The method of aspect 2, further comprising: transmitting a power headroom report based at least in part on the determined first transmit power and the second transmit power irrespective of dropping the first transmission.

Aspect 4: The method of any of aspects 1 through 3, wherein determining the second transmission parameter for the second transmission further comprises: determining a toggle state of a new data indicator for the second transmission irrespective of dropping the first transmission, wherein the second transmission parameter for the second transmission comprises the toggle state of the new data indicator; and wherein performing or receiving the second transmission is based at least in part on the determined toggle state of the new data indicator for the second transmission.

Aspect 5: The method of aspect 4, wherein determining the toggle state of the new data indicator for the second transmission is based at least in part on a difference between a first new data indicator associated with the first transmission indicated by the grant and a second new data indicator associated with the second transmission.

Aspect 6: The method of any of aspects 1 through 5, further comprising: generating, at a media access control layer, a protocol data unit based at least in part on receiving the grant; and determining a buffer status of a data buffer at the media access control layer based at least in part on the first set of resources and irrespective of dropping the first transmission.

Aspect 7: The method of aspect 6, wherein determining the buffer status of the data buffer further comprises: transferring the protocol data unit from the data buffer at the media access control layer to a hybrid automatic repeat request buffer at a physical layer based at least in part on the first set of resources and irrespective of dropping the first transmission; storing a transport block of the protocol data unit in the hybrid automatic repeat request buffer at the physical layer; and refraining from restoring the protocol data unit in the data buffer at the media access control layer irrespective of dropping the second transmission.

Aspect 8: The method of any of aspects 1 through 7, further comprising: determining a capability report indicating a number of receptions the UE is capable of receiving in a slot or indicating a number of transmissions the UE is capable of performing in the slot; and performing or receiving the second transmission according to the second transmission parameter based at least in part on the capability report irrespective of dropping the first transmission.

Aspect 9: The method of any of aspects 1 through 8, wherein the UE is configured for half duplex communications, and the grant comprises radio resource control signaling for a set of flexible symbols.

Aspect 10: The method of aspect 9, wherein the indication comprises a slot format indicator or downlink control information.

Aspect 11: The method of any of aspects 9 through 10, wherein the first transmission and the second transmission comprise an uplink transmission, or the first transmission and the second transmission comprise a downlink transmission.

Aspect 12: The method of any of aspects 1 through 11, wherein the first transmission comprises a physical uplink shared channel, physical uplink control channel, physical random access channel, a sounding reference signal, a physical downlink shared channel, or a channel state information reference signal.

Aspect 13: The method of any of aspects 1 through 12, wherein the indication comprises an uplink cancellation indication.

Aspect 14: A method for wireless communications at a base station, comprising: transmitting, to a UE, a grant for a first transmission scheduled for a first set of resources, the first transmission associated with a first transmission parameter; transmitting an indication for the UE to at least partially cancel the first transmission based at least in part on a second transmission scheduled for a second set of resources that overlaps with the first set of resources; determining a second transmission parameter for a third transmission based at least in part on the first transmission parameter; and performing or receiving the third transmission according to the second transmission parameter.

Aspect 15: The method of aspect 14, wherein determining the second transmission parameter for the third transmission further comprises: determining a first transmit power for the third transmission relative to a second transmit power of the first transmission indicated by the grant irrespective of the indication, wherein the second transmission parameter for the third transmission is the first transmit power.

Aspect 16: The method of any of aspects 14 through 15, further comprising: receiving a power headroom report comprising a first transmit power of the first transmission and a second transmit power of the third transmission irrespective of the indication.

Aspect 17: The method of any of aspects 14 through 16, wherein determining the second transmission parameter for the third transmission further comprises: determining whether the third transmission comprises new data with respect to the first transmission irrespective of the indication; and determining a toggle state of a new data indicator for the third transmission based at least in part on determining whether the third transmission comprises the new data, wherein the second transmission parameter for the third transmission comprises the toggle state of the new data indicator.

Aspect 18: The method of any of aspects 14 through 17, further comprising: receiving a capability report indicating a number of receptions that the UE is capable of receiving in a slot or indicating a number of transmissions the UE is capable of performing in the slot; and performing or receiving the third transmission according to the second transmission parameter based at least in part on the capability report irrespective of the indication.

Aspect 19: The method of any of aspects 14 through 18, wherein the UE is configured for half duplex communications, and the grant comprises radio resource control signaling for a set of flexible symbols.

Aspect 20: The method of aspect 19, wherein the indication comprises a slot format indicator or downlink control information.

Aspect 21: The method of any of aspects 19 through 20, wherein the first transmission and the third transmission are uplink transmissions and the second transmission is a downlink transmission, or the first transmission and the third transmission are downlink transmissions and the second transmission is an uplink transmission.

Aspect 22: The method of any of aspects 14 through 21, wherein the first transmission comprises a physical uplink shared channel, physical uplink control channel, physical random access channel, a sounding reference signal, a physical downlink shared channel, or a channel state information reference signal.

Aspect 23: The method of any of aspects 14 through 22, wherein the indication comprises an uplink cancellation indication.

Aspect 24: A method for wireless communications at a UE, comprising: receiving a first grant for a first transmission scheduled for a first set of resources; receiving a second grant for a second transmission scheduled for a second set of resources that overlaps with the first set of resources; dropping at least a portion of the first transmission based at least in part on receiving the second grant; receiving an indication for the UE to at least partially cancel the second transmission; dropping at least a portion of the second transmission based at least in part on receiving the indication; and refraining from rescheduling the first transmission on the first set of resources based at least in part on receiving the indication and irrespective of dropping the second transmission.

Aspect 25: The method of aspect 24, wherein refraining from rescheduling the first transmission further comprises: cancelling reception of the first transmission irrespective of dropping the second transmission.

Aspect 26: The method of aspect 25, wherein the first transmission comprises a semi-statically configured downlink transmission and the second transmission comprises a dynamically scheduled uplink transmission.

Aspect 27: The method of any of aspects 24 through 26, wherein refraining from rescheduling the first transmission further comprises: cancelling transmission of the first transmission irrespective of dropping the second transmission.

Aspect 28: The method of aspect 27, wherein the first transmission comprises a first uplink transmission and the second transmission comprises a second uplink transmission, and the first grant comprises a configured grant and the second grant comprises a dynamic grant.

Aspect 29: The method of any of aspects 24 through 28, wherein the indication comprises an uplink cancellation indication.

Aspect 30: A method for wireless communications at a base station, comprising: transmitting a first grant for a first transmission scheduled for a first set of resources; transmitting a second grant for a second transmission scheduled for a second set of resources that overlaps with the first set of resources; transmitting an indication for the UE to at least partially cancel the second transmission based at least in part on a third transmission scheduled for a third set of resources that overlaps with the second set of resources; and refraining from rescheduling the first transmission on the first set of resources based at least in part on transmitting the indication.

Aspect 31: The method of aspect 30, wherein refraining from rescheduling the first transmission further comprises: cancelling transmission of the first transmission irrespective of the indication.

Aspect 32: The method of aspect 31, wherein the first transmission comprises a semi-statically configured downlink transmission and the second transmission comprises a dynamically scheduled uplink transmission.

Aspect 33: The method of any of aspects 30 through 32, wherein refraining from rescheduling the first transmission further comprises: cancelling reception of the first transmission irrespective of the indication.

Aspect 34: The method of aspect 33, wherein the first transmission comprises a first uplink transmission and the second transmission comprises a second uplink transmission, and the first grant comprises a configured grant and the second grant comprises a dynamic grant.

Aspect 35: The method of any of aspects 30 through 34, wherein the indication comprises an uplink cancellation indication.

Aspect 36: An apparatus for wireless communications at a UE, comprising a processor; memory coupled with the processor; and instructions stored in the memory and executable by the processor to cause the apparatus to perform a method of any of aspects 1 through 13.

Aspect 37: An apparatus for wireless communications at a UE, comprising at least one means for performing a method of any of aspects 1 through 13.

Aspect 38: A non-transitory computer-readable medium storing code for wireless communications at a UE, the code comprising instructions executable by a processor to perform a method of any of aspects 1 through 13.

Aspect 39: An apparatus for wireless communications at a base station, comprising a processor; memory coupled with the processor; and instructions stored in the memory and executable by the processor to cause the apparatus to perform a method of any of aspects 14 through 23.

Aspect 40: An apparatus for wireless communications at a base station, comprising at least one means for performing a method of any of aspects 14 through 23.

Aspect 41: A non-transitory computer-readable medium storing code for wireless communications at a base station, the code comprising instructions executable by a processor to perform a method of any of aspects 14 through 23.

Aspect 42: An apparatus for wireless communications at a UE, comprising a processor; memory coupled with the processor; and instructions stored in the memory and executable by the processor to cause the apparatus to perform a method of any of aspects 24 through 29.

Aspect 43: An apparatus for wireless communications at a UE, comprising at least one means for performing a method of any of aspects 24 through 29.

Aspect 44: A non-transitory computer-readable medium storing code for wireless communications at a UE, the code comprising instructions executable by a processor to perform a method of any of aspects 24 through 29.

Aspect 45: An apparatus for wireless communications at a base station, comprising a processor; memory coupled with the processor; and instructions stored in the memory and executable by the processor to cause the apparatus to perform a method of any of aspects 30 through 35.

Aspect 46: An apparatus for wireless communications at a base station, comprising at least one means for performing a method of any of aspects 30 through 35.

Aspect 47: A non-transitory computer-readable medium storing code for wireless communications at a base station, the code comprising instructions executable by a processor to perform a method of any of aspects 30 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a first grant for a first transmission scheduled for a first set of resources, the first transmission associated with a first transmission parameter;
   receiving an indication of a second transmission scheduled for a second set of resources, the second transmission scheduled to be after the first transmission;
   receiving, after receiving the indication of the second transmission, an indication for the UE to at least partially cancel the first transmission;
   dropping at least a portion of the first transmission based at least in part on receiving the indication for the UE to at least partially cancel the first transmission;
   determining a second transmission parameter for the second transmission based at least in part on the first transmission parameter and whether the first transmission is dropped; and
   performing or receiving the second transmission according to the second transmission parameter.

2. The method of claim 1, wherein the indication for the UE to at least partially cancel the first transmission comprises an uplink cancellation indication.

3. The method of claim 1, wherein determining the second transmission parameter for the second transmission further comprises:
   determining a first transmit power for the second transmission relative to a second transmit power of the first transmission indicated by the first grant and whether the first transmission is dropped, wherein the second transmission parameter for the second transmission is the first transmit power.

4. The method of claim 3, further comprising:
   transmitting a power headroom report based at least in part on the determined first transmit power, the second transmit power and whether the first transmission is dropped.

5. The method of claim 1, wherein determining the second transmission parameter for the second transmission further comprises:
   determining a toggle state of a new data indicator for the second transmission based at least in part on whether the first transmission is dropped, wherein the second transmission parameter for the second transmission comprises the toggle state of the new data indicator; and
   wherein performing or receiving the second transmission is based at least in part on the determined toggle state of the new data indicator for the second transmission.

6. The method of claim 5, wherein determining the toggle state of the new data indicator for the second transmission is based at least in part on a difference between a first new data indicator associated with the first transmission indicated by the first grant and a second new data indicator associated with the second transmission, and wherein the first transmission and the second transmission comprise an uplink transmission, or the first transmission and the second transmission comprise a downlink transmission.

7. The method of claim 1, further comprising:
generating, at a media access control layer, a protocol data unit based at least in part on receiving the first grant; and
determining a buffer status of a data buffer at the media access control layer based at least in part on the first set of resources and whether the first transmission is dropped.

8. The method of claim 7, wherein determining the buffer status of the data buffer further comprises:
transferring the protocol data unit from the data buffer at the media access control layer to a hybrid automatic repeat request buffer at a physical layer based at least in part on the first set of resources and whether the first transmission is dropped;
storing a transport block of the protocol data unit in the hybrid automatic repeat request buffer at the physical layer; and
refraining from restoring the protocol data unit in the data buffer at the media access control layer based at least in part on whether the second transmission is dropped.

9. The method of claim 1, further comprising:
determining a capability report indicating a number of receptions the UE is capable of receiving in a slot or indicating a number of transmissions the UE is capable of performing in the slot; and
performing or receiving the second transmission according to the second transmission parameter based at least in part on the capability report and whether the first transmission is dropped.

10. The method of claim 1, wherein the UE is configured for half duplex communications, and wherein the first grant comprises radio resource control signaling for a set of flexible symbols, and wherein the indication for the UE to at least partially cancel the first transmission comprises a slot format indicator or downlink control information.

11. The method of claim 1, wherein the first transmission comprises a physical uplink shared channel, physical uplink control channel, physical random access channel, a sounding reference signal, a physical downlink shared channel, or a channel state information reference signal.

12. A method for wireless communications at a network entity, comprising:
transmitting, to a user equipment (UE), a first grant for a first transmission scheduled for a first set of resources, the first transmission associated with a first transmission parameter;
transmitting, to the UE, an indication of a second transmission scheduled for a second set of resources, the second transmission scheduled to be after the first transmission;
transmitting, after transmitting the indication of the second transmission, an indication for the UE to at least partially cancel the first transmission based at least in part on the second transmission scheduled for the second set of resources that overlaps with the first set of resources;
determining a second transmission parameter for a third transmission based at least in part on the first transmission parameter; and
performing or receiving the third transmission according to the second transmission parameter.

13. The method of claim 12, wherein the indication for the UE to at least partially cancel the first transmission comprises an uplink cancellation indication.

14. The method of claim 12, wherein determining the second transmission parameter for the third transmission further comprises:
determining a first transmit power for the third transmission relative to a second transmit power of the first transmission indicated by the first grant and based at least in part on whether the indication for the UE to at least partially cancel the first transmission is received at the UE, wherein the second transmission parameter for the third transmission is the first transmit power, wherein the first transmission and the third transmission are uplink transmissions and the second transmission is a downlink transmission, or the first transmission and the third transmission are downlink transmissions and the second transmission is an uplink transmission.

15. The method of claim 12, further comprising:
receiving a power headroom report comprising a first transmit power of the first transmission and a second transmit power of the third transmission and based at least in part on whether the indication for the UE to at least partially cancel the first transmission is received at the UE.

16. The method of claim 12, wherein determining the second transmission parameter for the third transmission further comprises:
determining whether the third transmission comprises new data with respect to the first transmission and based at least in part on whether the indication for the UE to at least partially cancel the first transmission is received at the UE; and
determining a toggle state of a new data indicator for the third transmission based at least in part on determining whether the third transmission comprises the new data, wherein the second transmission parameter for the third transmission comprises the toggle state of the new data indicator.

17. The method of claim 12, further comprising:
receiving a capability report indicating a number of receptions that the UE is capable of receiving in a slot or indicating a number of transmissions the UE is capable of performing in the slot; and
performing or receiving the third transmission according to the second transmission parameter based at least in part on the capability report and whether the indication for the UE to at least partially cancel the first transmission is received at the UE.

18. The method of claim 12, wherein the UE is configured for half duplex communications, and wherein the first grant comprises radio resource control signaling for a set of flexible symbols, and wherein the indication for the UE to at least partially cancel the first transmission comprises a slot format indicator or downlink control information.

19. An apparatus for wireless communications at a user equipment (UE), comprising:
at least one processor,
memory coupled with the processor; and
instructions stored in the memory and executable by the at least one processor to cause the apparatus to:
receive a first grant for a first transmission scheduled for a first set of resources, the first transmission associated with a first transmission parameter;
receive an indication of a second transmission scheduled for a second set of resources, the second transmission scheduled to be after the first transmission;

receive, after receiving the indication of the second transmission, an indication for the UE to at least partially cancel the first transmission;

drop at least a portion of the first transmission based at least in part on receiving the indication for the UE to at least partially cancel the first transmission;

determine a second transmission parameter for the second transmission based at least in part on the first transmission parameter and whether the first transmission is dropped; and perform or receive the second transmission according to the second transmission parameter.

20. The apparatus of claim 19, wherein the instructions to determine the second transmission parameter for the second transmission further are executable by the at least one processor to cause the apparatus to:

determine a first transmit power for the second transmission relative to a second transmit power of the first transmission indicated by the first grant and whether the first transmission is dropped, wherein the second transmission parameter for the second transmission is the first transmit power; and transmit a power headroom report based at least in part on the determined first transmit power, the second transmit power and whether the first transmission is dropped.

21. The apparatus of claim 19, wherein the instructions to determine the second transmission parameter for the second transmission further are executable by the at least one processor to cause the apparatus to:

determine a toggle state of a new data indicator for the second transmission based at least in part on whether the first transmission is dropped, wherein the second transmission parameter for the second transmission comprises the toggle state of the new data indicator; and wherein performing or receiving the second transmission is based at least in part on the determined toggle state of the new data indicator for the second transmission.

22. The apparatus of claim 21, wherein determining the toggle state of the new data indicator for the second transmission is based at least in part on a difference between a first new data indicator associated with the first transmission indicated by the first grant and a second new data indicator associated with the second transmission, and wherein the first transmission and the second transmission comprise an uplink transmission, or the first transmission and the second transmission comprise a downlink transmission.

23. The apparatus of claim 19, wherein the instructions are further executable by the at least one processor to cause the apparatus to:

generate, at a media access control layer, a protocol data unit based at least in part on receiving the first grant; and determine a buffer status of a data buffer at the media access control layer based at least in part on the first set of resources and whether the first transmission is dropped.

24. The apparatus of claim 23, wherein the instructions to determine the buffer status of the data buffer further are executable by the at least one processor to cause the apparatus to:

transfer the protocol data unit from the data buffer at the media access control layer to a hybrid automatic repeat request buffer at a physical layer based at least in part on the first set of resources and whether the first transmission is dropped;

store a transport block of the protocol data unit in the hybrid automatic repeat request buffer at the physical layer; and refrain from restoring the protocol data unit in the data buffer at the media access control layer based at least in part on whether the first transmission is dropped.

25. The apparatus of claim 19, wherein the instructions are further executable by the at least one processor to cause the apparatus to:

determine a capability report indicating a number of receptions the UE is capable of receiving in a slot or indicating a number of transmissions the UE is capable of performing in the slot; and perform or receive the second transmission according to the second transmission parameter based at least in part on the capability report and whether the first transmission is dropped.

26. The apparatus of claim 19, wherein the UE is configured for half duplex communications, and wherein the first grant comprises radio resource control signaling for a set of flexible symbols, and wherein the indication for the UE to at least partially cancel the first transmission comprises a slot format indicator or downlink control information.

27. An apparatus for wireless communications at a network entity, comprising:

at least one at least one processor, memory coupled with the at least one processor; and instructions stored in the memory and executable by the at least one processor to cause the apparatus to:

transmit, to a user equipment (UE), a first grant for a first transmission scheduled for a first set of resources, the first transmission associated with a first transmission parameter;

transmit, to the UE, an indication of a second transmission scheduled for a second set of resources, the second transmission scheduled to be after the first transmission;

transmit, after transmitting the indication of the second transmission, an indication for the UE to at least partially cancel the first transmission based at least in part on the second transmission scheduled for the second set of resources that overlaps with the first set of resources;

determine a second transmission parameter for a third transmission based at least in part on the first transmission parameter; and perform or receive the third transmission according to the second transmission parameter.

28. The apparatus of claim 27, wherein the instructions to determine the second transmission parameter for the third transmission further are executable by the at least one processor to cause the apparatus to:

determine a first transmit power for the third transmission relative to a second transmit power of the first transmission indicated by the first grant and based at least in part on whether the indication for the UE to at least partially cancel the first transmission is received at the UE, wherein the second transmission parameter for the third transmission is the first transmit power, wherein the first transmission and the third transmission are uplink transmissions and the second transmission is a downlink transmission, or the first transmission and the third transmission are downlink transmissions and the second transmission is an uplink transmission.

29. The apparatus of claim 27, wherein the instructions are further executable by the at least one processor to cause the apparatus to:
- receive a power headroom report comprising a first transmit power of the first transmission and a second transmit power of the third transmission and based at least in part on whether the indication for the UE to at least partially cancel the first transmission is received at the UE.

30. The apparatus of claim 27, wherein the instructions to determine the second transmission parameter for the third transmission further are executable by the at least one processor to cause the apparatus to:
- determine whether the third transmission comprises new data with respect to the first transmission and based at least in part on whether the indication for the UE to at least partially cancel the first transmission is received at the UE; and
- determine a toggle state of a new data indicator for the third transmission based at least in part on determining whether the third transmission comprises the new data, wherein the second transmission parameter for the third transmission comprises the toggle state of the new data indicator.

* * * * *